US00RE37213E

(19) United States
(12) Reissued Patent
Staggs

(10) Patent Number: US RE37,213 E
(45) Date of Reissued Patent: Jun. 12, 2001

(54) CONTAINER FOR PRODUCING COLD FOODS AND BEVERAGES

(76) Inventor: Jeff J. Staggs, 7474 E. Arkansas Ave. #8-10, Denver, CO (US) 80231

(21) Appl. No.: 08/579,091

(22) Filed: Dec. 21, 1995

Related U.S. Patent Documents

Reissue of:
(64) Patent No.: 5,271,244
Issued: Dec. 21, 1993
Appl. No.: 07/820,480
Filed: Jan. 14, 1992

(51) Int. Cl.[7] ..... F25D 3/06
(52) U.S. Cl. ..... 62/457.3; 62/530
(58) Field of Search ..... 62/457.3, 457.4, 62/457.5, 529, 530, 389, 1

(56) References Cited

U.S. PATENT DOCUMENTS

| | | | | |
|---|---|---|---|---|
| Re. 24,444 | * | 3/1958 | Evans | 62/529 |
| 1,007,060 | * | 10/1911 | Brazelle | 62/530 |
| 1,369,367 | * | 2/1921 | Thomsen | 62/457 |
| 1,771,186 | * | 7/1930 | Mock | 62/457 |
| 2,039,739 | * | 5/1936 | Munters | 62/457 |
| 2,622,415 | * | 12/1952 | Landers et al. | 62/457.3 |
| 2,838,916 | * | 6/1958 | Sola | 62/457.3 |
| 3,161,031 | * | 12/1964 | Flannery | 62/457 |
| 3,205,677 | * | 9/1965 | Stoner | 62/457 |
| 3,205,678 | * | 9/1965 | Stoner | 62/457 |
| 3,302,427 | * | 2/1967 | Stoner et al. | 62/457 |
| 3,302,428 | * | 2/1967 | Stoner et al. | 62/457 |
| 3,360,957 | * | 1/1968 | Paquin | 62/457 |
| 3,394,562 | * | 7/1968 | Coleman | 62/457 |
| 3,463,140 | * | 8/1969 | Rollor | 62/457.3 |
| 3,603,106 | * | 9/1971 | Ryan et al. | 62/457.4 |
| 3,680,330 | * | 8/1972 | Canosa | 62/457 |
| 3,696,636 | * | 10/1972 | Mille | 62/399 |
| 3,715,895 | * | 2/1973 | Devlin | 62/457.3 |
| 4,163,374 | * | 8/1979 | Moore et al. | 62/457 |
| 4,299,100 | * | 11/1981 | Crisman et al. | 62/457 |
| 4,350,712 | * | 9/1982 | Kocharian et al. | 426/134 |
| 4,357,809 | * | 11/1982 | Held et al. | 62/457.4 |
| 4,378,625 | * | 4/1983 | Crisman et al. | 62/457 |
| 4,401,449 | * | 8/1983 | Martin et al. | 62/59 |
| 4,531,381 | * | 7/1985 | Toro et al. | 62/372 |
| 4,534,354 | * | 8/1985 | Bonner | 62/530 |
| 4,625,518 | * | 12/1986 | Freedman | 62/1 |
| 4,782,670 | * | 11/1988 | Long et al. | 62/457.4 |
| 4,790,999 | * | 12/1988 | Ashmont et al. | 426/592 |
| 4,882,914 | * | 11/1989 | Haines-Keeley et al. | 62/457.4 |
| 4,901,887 | * | 2/1990 | Burton | 222/131 |
| 5,031,418 | * | 7/1991 | Hirayama et al. | 62/530 |
| 5,207,076 | * | 5/1993 | Sciarillo | 62/457.4 |
| 5,269,156 | * | 12/1993 | Van De Velde et al. | 62/457.4 |

OTHER PUBLICATIONS

"How to Get the Best from Your Refrigerator" with cover and pp. 10 and 11—An Owners Manual for G.E. Refrigerators.*

* cited by examiner

*Primary Examiner*—William Doerrler

(57) ABSTRACT

A drinking mug or tumbler-like device self equipped to rapidly transform its contents into a congealed, or very low temperature liquid condition comprising an inner container enclosed within a larger outer container that is filled with a water based refrigerant in the space therebetween, and hermetically sealed with a special seal gasket arrangement. In preparation for use, the device in placed in a refrigerator freezer until the refrigerant is solidified. The contents are then poured into the container and cooled as heat is absorbed by the refrigerant through the walls of the inner container. The specially proportioned inner container aids transfer of heat energy to speed cooling of the contents, along with a fabric which aids in the distribution of thermal energy throughout the refrigerant, and also controls the degree of congealment within the beverage, and refrigerant. The refrigerant compartment is specially designed to assist directing of the expansion volume of the frozen refrigerant away from the walls and into an expansion absorber fitted at the bottom of the compartment. The exterior of the device is easily detachable from the remainder of the unit to reduce preparation time in the freezer, and to allow retrofit for altered cooling performance, decorative appeal, and adaptation for outdoor use. The concepts identified above are also applicable in the design of hot cup devices.

65 Claims, 7 Drawing Sheets

CONTAINER FOR PRODUCING COLD FOODS AND BEVERAGES

Matter enclosed in heavy brackets [ ] appears in the original patent but forms no part of this reissue specification; matter printed in italics indicates the additions made by reissue.

TABLE OF CONTENTS

Background of the Invention
Field of Invention
Description of the Invention
Summary of the Invention
Brief Description of the Drawings
Reference Numerals in Drawings
Description of the Preferred Embodiments
Claims

BACKGROUND OF THE INVENTION

1. Field of Invention

The invention relates to a holding container equipped with an inner container surrounded by a layer of thermally treated material for the purpose of inducing and maintaining a desired thermal condition of the contents placed within the inner container.

2. Description of the Prior Art

It is generally held as desirable to consume beverages such as beer, soft drinks, and fruit juices, when they are cold. Placing ice cubes in the drink is the common way of doing this. While reasonably effective for keeping the drink cook, the melting ice causes the drink to lose carbonation, and become watery, destroying the quality of the beverage.

Preparing and serving ice cubes is messy, and bothersome, and backlog of them takes up valuable freezer space. Though automatic ice cube makers reduce some of the hassle of preparing ice, they are very expensive, and require special installation and routine servicing. Ice made in automatic ice cube makers, can become contaminated with chemical and mineral impurities that accumulate in the water supply lines. In addition to imparting a foul taste, these contaminants are capable of causing severe illness in persons that consume beverages containing contaminated ice. As indicated in the instruction manuals that come with automatic ice makers, routine servicing must be done in order to avoid this very unpleasant possibility. In addition to this extra inconvenience, the knowledge that increasing amounts of pollutants are accumulating in one's supply of beverage ice cannot be said to add one's drinking pleasure!

Another disadvantage of ice is that it absorbs odors from other foods stored in the freezer. These odors also imparting a foul taste to the ice and hence, the beverage in which they are used. This often results in the need to discard the ice, which is wasteful of water, energy, and one's time.

The quantity of ice commonly used during beverage consumption is far more than is actually needed to cool the drink. The usual practice of discarding ice after the drink is finished, wastes perhaps as much water and energy as is used in the drink itself. Though this quantity seems small on a unit basis, it is the way in which over 300 million beverage are consumed each day in the U.S. alone!

Though ice cubes are inconvenient, messy, destructive to the beverage quality, wasteful of water and energy resources, they prevail as the dominant way of cooling beverages during their consumption.

The aim of the prior art has been to produce a drinking tumbler or similar device, that is equipped with its own refrigerant, that cools the beverage, without the use of ice, with the promise of greater convenience, and improved beverage quality. In spite of these alleged advantages over the conventional ice cube method, many factors have hampered widespread success of beverage coolers of the prior art. Bulk, expense, unattractiveness, discomfort in use, short product life, along with poor cooling performance, have weighted heavily against the commercial success of these devices.

The basic design of these beverage cooling devices has changed very little in the 60 years since their introduction by Mock, U.S. Pat. No. 1,771,186 (1928). An inner container, or "cup", holds the drink while it is being consumed. The inner container is enclosed within a larger outer container. The compartment between the containers, is filled with a water based refrigerant, and hermetically sealed. The beverage is cooled, as heat is absorbed by the refrigerant, through the walls of the inner container. The refrigerant, usually a plastic "gel", or water solution containing propylene glycol, alcohol, or various minerals salts, is frozen by placing the beverage cooler into the freezer compartment of a refrigerator.

When frozen, the refrigerant, being mostly water, gains about 10% in additional volume. Because of this extra volume, the compartment holding the refrigerant is filled to only 75% to 90% of its capacity, as rupture of the walls results from freezing one that is completely full. The remaining 10% to 25% of the compartment, contains a void or air space, often referred to as an "expansion air space". This expansion air space is intended to allow a place for the expansion volume of the refrigerant.

The position of this "expansion air space" within the compartment holding the refrigerant, is critical to the operation of several prior art beverage coolers. The designs of Mock, U.S. Pat. No. 1,771,186 (1928), Stoner, U.S. Pat. Nos. 3,205,677, 3,205,678 (1965) and 3,302,428 (1967) and Paquin, U.S. Pat. No. 3,360,957 (1968), and others, required the unit to be placed upside down when frozen in the refrigerator freezer. Failure to invert the unit reduces cooling performance as the frozen mass of refrigerant is inclined to slide out of contact with the inner container as the refrigerant begins to melt, disconnecting the refrigerant from thermal contact with the beverage. Another reason is that freezing the unit in the upright position places the expansion air space in the upper portion of the compartment, depriving the more important upper portion of the beverage of refrigerant for cooling. This condition gets progressively worse as the refrigerant melts. The melted refrigerant, having a smaller volume than when frozen, settles to the bottom of the compartment, leaving the upper portion of the inner container out of contact with the refrigerant. The upper portion of the beverage is at more of a disadvantage than any other region of the beverage, having the lowest amount of contact area with the refrigerant, and the greatest amount of exposure to heat from the environment. The temperature of the beverage in this area rises rapidly, once the refrigerant loses contact with the adjoining wall of the inner container.

The condition just described, is further worsened when the upper portion of the inner container is tapered outward, a common practice of the prior art. The taper reduces the volume of the upper region of the compartment, and hence the amount of refrigerant available for cooling that portion of the beverage. Because the volume of this area is so much less by comparison to the bottom region, a loss of just 10% in the volume of the refrigerant may cause a third or more of the upper portion of the inner container to be uncovered! The taper provides still more disadvantages, by enlarging the opening of the inner container. This exposes an even greater amount of the beverage to heat contamination from the environment than the straight sided inner container described earlier, while exaggerating the loss of refrigerant available to this area. A beverage cooler of this configuration would be very difficult, if not impossible to maintain at a consistant temperature throughout.

Another reason prior art beverage coolers are frozen upside down is to position the expansion air space between the bottoms of the inner and outer containers. This is done to prevent fracture and bowing of the bottoms when the refrigerant expands. If the unit is placed right side up in the refrigerant freezer, the refrigerant immediately fills the space between the bottoms of the containers. This puts the expansion air space at the other end of the compartment, depriving the area between the bottom of the containers of space for the extra volume of refrigerant to expand. The result, if not a wall fracture, is an excessive amount of bowing of the bottom of the container, to the extent of causing the unit to stand lopsided. Moore et al., U.S. Pat. No. 4,163,374 (1979), observed these forces to be sufficient to cause the retaining ring, that held his entire unit together, to disengage from the outer container to which it was attached. This occurred in spite of high elasticity of both the styrofoam outer container, and the flexible plastic retaining ring! Forces like these, imposed on container walls made of more rigid materials, such as metal or glass, are sufficient to cause fracture of the walls, and permanent damage to the unit. It then becomes necessary to increase the wall thickness in order to resist the forces imposed on them. Thicker container walls, on the other hand, are undesirable in that they add bulk, material cost, and greatly slow the cooling speed of the unit, particularly if constructed of low conductivity materials such as glass or plastic.

Compression of the expansion air space is another contributor to stresses imposed upon the container walls. This occurs when the refrigerant expands to its larger frozen volume.

For example, a typical prior art refrigerant compartment filled to 90% capacity has an expansion air space equal to the remaining 10% of the volume of the compartment. As previously stated, the refrigerant gains about 10% volume when frozen, resulting in an expanded volume that occupies about 99% of the volume of the compartment. This leaves only 1% of the compartment available to contain the expansion air space. While the expansion air space will lose about 1/6th of its volume when reduced to 0° F. in the freezer, that leaves a volume that would normally occupy 8.3% of the compartment compressed into a space equal to about 1%! This results in a buildup of air pressure within the compartment that threatens the hermetic condition of the compartment. It may also cause the walls of thinner walled units to bow placing limits on the thinness of the walls that would not otherwise apply.

Compression of the expansion air space may also occur during the dry cycle of an automatic dishwasher. At around 175° F., a typical prior art beverage cooler with a 10% expansion air space will see about a 40% compression of the air space. This degree of compression is not as great as is experienced from the expanded refrigerant, but in combination with heat and moisture it may cause permanent warpage to plastic walled units.

Changes of elevation also affect compression of the expansion air space. Within habitable elevations, say from sea level to around 5,000 feet, the expansion air space will undergo compression to a similar degree to what may be expected in the dry heat cycle of an automatic dishwasher.

For example, a unit manufactured in Los Angeles, and shipped to Denver, or Albuquerque, may experience outward bowing of the compartment walls upon arrival. The buildup of air pressure may also be sufficient to rupture the hermetic seal, resulting in leakage of the refrigerant out of the compartment.

Conversely, a similar unit manufactured in Denver or Albuquerque, and shipped to Los Angeles may find the walls of the beverage cooler "caved in" upon arrival. The air pressure within the compartment resulting from the difference in air density between the two elevations may also be sufficient to rupture the hermetic seal to the destruction of the unit.

Still another inherent disadvantage of using the expansion air space, is the need for precise measuring of the refrigerant during manufacture of the beverage cooler. Improper metering of the refrigerant can have drastic consequences on the performance of the unit. Too little refrigerant reduces available cooling power, and exaggerates loss of contact with the upper portion of the inner container as already described. Too much refrigerant may cause permanent damage to the unit, should the expanded volume of the refrigerant exceed the volume of the expansion air space.

Another prior art strategy used for dealing with the problems of the expanded refrigerant , is to shift the extra volume into the wall of the outer container. Used in combination with an expansion air space, Stoner, U.S. Pat. No. 3,205,678 (1965), recommends the use of plastic inner and outer containers, with a thicker inner container wall. The extra rigidity of the thicker inner container wall is intended to resist buckling from the expanded refrigerant, causing it to shift outwardly into the outer wall. The thinner, more flexible outer wall is allowed to bow in response to the force of the expanded refrigerant.

The consequence of adding to the wall thickness of the inner container, is that it greatly slows the cooling affect upon the beverage. This is most dramatic in containers made of low thermal conductors such as plastic. Even slight increases in the wall thickness of inner containers made of plastic has a profound affect upon the cooling speed.

The problem with using a thinner walled outer container, is that it tends to concentrate the expansion volume of the refrigerant in toward the inner container, contrary to the desired goal. The higher thermal conductivity of the thinner outer container wall, coupled with its larger surface area and exterior exposure, cause the refrigerant to freeze from the outside in. This pushes the expansion volume of the refrigerant in toward the inner container, which must resist this force until it can be deflected outwardly again. Having to resist this concentration of force adds further to the thickness requirement of the inner container and hence, the slowing of the cooling speed of the beverage cooler.

A similar approach, recommended by Moore, et al., U.S. Pat. Nos. 4,163,374 (1979), 4,299,100 (1981), 4,378,625 (1983), uses a styrofoam outer container to absorb the expansion volume of the frozen refrigerant. Though styrofoam is initially resilient, with repeated use it quickly loses its ability to recover from compression. The rigid structure breaks down, resulting in weakened walls that crack and leak refrigerant. Styrofoam is too fragile to join other materials to with any degree of reliability in the strength of the connection. Disengagement of component connections could easily occur as a result of uneven distribution of the refrigerant between the containers to the destruction of the unit. The inward and outward flexing action in response to the freezing and thawing of the refrigerant also threatens the integrity of the connections.

The high thermal insulative properties of styrofoam prevent a significant amount of thermal energy from traveling out of the refrigerant through the outer container wall. This greatly increases the amount of time required to prepare the unit for use in the refrigerator freezer, by perhaps a factor of 5.

The increased probability of wall fractures and leaks, makes the styrofoam outer container design dependent on the use of plastic "gel" refrigerants. Gel refrigerants have the disadvantage of being more expensive, more toxic, less durable, and have a higher coefficient of expansion upon freezing than most liquid refrigerants. Gels are also more difficult to load into the beverage cooler, and require special manufacturing processes and component design features. A lot of prior art is devoted to solving the problems related to loading the gel into the beverage cooler.

The all metal, inner and outer container beverage coolers of the prior art also have a several inherent flaws. The designs of Thomsen, U.S. Pat. No. 1,369,367 (1921), Mock U.S. Pat. No. 1,771,186 (1928), Munters U.S. Pat. No. 2,039,736 (1931), Flannery U.S. Pat. No. 3,161,031 (1964), Stoner U.S. Pat. No. 3,205,677 (1965), Coleman U.S. Pat. No. 3,394,562 (1967), and Canosa U.S. Pat. No. 3,680,330, (1972), ect., all recommend the use of metal inner and outer containers.

Metal containers in general, are heavier, and more expensive to produce than those made of plastic. Aluminum is often the preferred metal of the prior art, being relatively lightweight, corrosion resistant, and having a high coefficient of thermal conductivity.

The problems inherent in the all metal beverage cooler design, are derived mainly from the outer container. Being much larger than the inner container, the outer container represents the major portion of the weight and cost of the unit. Its largest surface area, coupled with its high thermal conductivity and exterior exposure, attract heat from the environment, even when fitted with insulation. This creates a power drain on the refrigerant.

Another area of thermal inefficiency occurs around the top horizontal portions connecting the two containers. The high thermal conductivity of the metal, creates a thermal exchange interaction between the containers, to bring them into thermal equallibrium with each other. This condition is undesirable, as the inner container in contact with the beverage, becomes warmer, while the outer container, most vulnerable to heat contamination from the environment, becomes warmer, attracting still more heat. In addition to causing a warmer beverage, it causes the beverage cooler to lose power faster.

The relationship between the proportions of the inner container, and the speed and uniformity of cooling of the beverage, are factors hitherto unappreciated by the prior art. Tub shaped inner containers, typically used by the prior art, produce a beverage cooler that is slower and less uniform in cooling than one with an elongated inner container.

A tub shaped container, generally has a height equal to less than about 2 diameters. The large diameter relative to the height, give the container a "tub-like" appearance, hence the name. While generally lacking specific dimensions, the drawing figures shown in the following U.S. patents; Devlin U.S. Pat. No. 3,715,895 (1973), Canosa U.S. Pat. No. 3,680,330 (1972), Coleman U.S. Pat. No. 3,394,562 (1968), Paquin U.S. Pat. No. 3,360,957 (1968), Stoner U.S. Pat. No. 3,205,677 (1965), Flannery U.S. Pat. No. 3,161,031, (1964), show tub shaped inner containers.

The inherent disadvantages of having a tub shaped inner container, is that, due to the natural configuration, a great deal of refrigerant is concentrated around the bottom of the container, furthest away from the more critical upper portion of the container. The larger diameter opening exposes more of the beverage to heat contamination from the room environment, while increasing the distance the heat must travel to go from the beverage into the refrigerant. The loss of contact between the refrigerant, and the upper portion of the inner container is greater, especially when it is tapered outward, as described earlier in this section.

In addition to taking longer to induce cooling of the beverage, the surface of the beverage tends to be warmer than the lower region in beverage coolers with tub shaped inner containers. They lose power sooner, and require more refrigerant in order to produce and maintain slush.

Devlin, U.S. Pat. No. 3,715,895 (1973), recommends a refrigerant volume equal to up to 3 times the volume of the beverage. In spite of this enormous volume of refrigerant, it still took up to ten minutes to produce a slush in his mug, even using prerefrigerated ingredients! In addition to being slow, a 355 ml. (12 ounce) capacity mug of this description would weigh at least 1.5 kilos (3 pounds)! That is more than twice the weight of an ordinary glass beer mug!

The performance of a poorly designed beverage cooler may sometimes be improved by overwhelming it with a very large mass of refrigerant, like the one just described. The added bulk, however, produces a unit that is heavier, and less attractive, in addition to being more expensive.

The cooling speed of a prior art beverage cooler could be increased by lowering the freezing point of the refrigerant, but it also reduces the enthalpy (heat content) of the refrigerant. A refrigerant with a lower freezing point takes longer to freeze, and loses power sooner than one with a higher freezing point. This diminishes the overall performance of the beverage cooler in ways that can only be compensated for by again increasing the volume of the refrigerant, an undesirable alternative.

As can be seen in the many examples sighted above, several problems continue to plaque beverage cooling devices of the prior art. We see how the so called solutions to these problems have often given rise to new problems, unrecognized and unsolved by the prior art.

These factors add up to a variety of poorly performing beverage cooling devices, that after more than 60 years of development, have failed to produce a commercially significant design, that offers a viable alternative to the common prepared ice method of beverage cooling. Dispite the fact that ice cubes are messy, inconvenient, wasteful, and destructive to beverage quality, they remain the only method, generally available to the public, for cooling beverages during consumption.

SUMMARY OF THE INVENTION

Accordingly, several objects and advantages of my invention are a beverage cooler, self equipped to cool a beverage contained therein to any desired temperature, within the range of cold beverage consumption, without the use of ice cubes or prefrigeration of the beverage in the refrigerator. Slushes, milk shakes, chilled drinks, ice cream, and frozen yogurt can be produced from room temperature ingredients within minutes, and sustained at their low temperature for hours. My beverage cooler can reduce beer and soft drinks to temperatures as low as 28° F. for a unique drinking experience that cannot be duplicated with ice regardless of quantity. My beverage cooler gives the consumer and server of the beverage control over the temperature and consistancy of the beverage while it is being consumed.

Carbonated beverages are smoother tasting and less filling when served from my beverage cooler than those drunk from conventional mugs and tumblers. My beverage cooler can be designed to raise a "taller head of foam" than conventional drinking containers when the beverage is poured. The foam releases the flavoring agents within the beverage and reduces the amount of carbonation gas ingested by the consumer. This increases drinking pleasure and reduces the chance of digestive discomfort that some individuals experience from ingesting carbonated beverages.

Though the amount of gas released from the beverage when it is first poured is high, the subsequent rate of carbonation release is much lower than with conventional drinking containers. The conservation of carbonation within the beverage, along with its low temperature, preserves the freshness of the beverage for hours.

My beverage cooler performs particularly well as a water drinking tumbler. It automatically forms its own ice from the water placed therein. The ice that forms along the walls of the inner container helps maintain the low temperature of 0° C. (32° F.) of the water therein. It also nearly doubles the amount of time the beverage cooler is able to sustain the low temperature of the water. The ice, being made up entirely of the beverage water, does not affect the taste, or purity of the beverage when it melts. This is very important concerning the use of bottled water for drinking. Consumers that prefer bottled water over tap water pay a much higher price to enjoy the superior quality of bottled water. Unfortunately, to preserve the quality of the bottled water, for which they have paid extra for, it then becomes necessary to make ice cubes from the bottled water, lest those made from tap water melt, and ruin the taste of the drink. In addition to inconvenience, this adds still more cost to the use of bottled water. With my beverage cooler, there is never a need to prepare ice, or be concerned about the diluting affects of melting ice on the beverage.

Slushes made from fruit juices, drink mixes, carbonated beverages, and even wine, can be made in my beverage cooler, from unrefrigerated ingredients. The beverage is simply poured into the beverage cooler , and occasionally stirred under the desired consistency is achieved. For unrefrigerated beverages, about 10 minutes is sufficient to produce a slush. Prerefrigerated beverage produce a slush almost instantly, and retain their consistency longer than those produced from room temperature. The slushes that are produced from carbonated beverages, are practically indistinguishable from those currently available from machines in supermarkets and convenience stores. With my invention, the consumer can prepare slushes at home within minutes, without having to make a trip to the store. The slushes produced at home are less expensive than those purchased from the grocery store, yet are made from the exact same ingredients. The consumer also has the option of making slushes from other carbonated beverages not available from store machines, and is no longer limited by their small selection.

Another advantage of my beverage cooler, is that unlike the cups that hold store bought slushes, my beverage cooler continues to preserve the low temperature, and slush consistency of the slush during consumption. The slushes made from fruit juices, drink mixes, and wine, have a fine, velocity smooth texture that is very unique and delightful to eat. The texture of the slush is far superior to those made from crushed ice, without the bother of preparing the crushed ice and mixing it with the beverage.

Like the slushes made from carbonated beverages, the beverage need only be poured into the beverage cooler and stirred a few times to produce a slush. There is no need to prepare or crush ice in any way to produce a slush. In addition to the convenience, and superior slush texture produced by my beverage cooler over crushed ice slushes, they, unlike crushed ice slushes, maintain their flavor consistency, even while they melt. This is because the slush is made up entirely of the beverage material itself, and does not alter the balance of ingredients upon melting like crushed ice slushes do.

Crushed ice slushes, on the hand, being made up of tiny particles of ice mixed with the beverage, water down the beverage as the slush melts. This ruins the beverage flavor, and consistency, in the same way that ice cubes do when they melt in the beverage. This never occurs with slushes made in my beverage cooler. The melting of the slush serves only to release more of the beverage to be drunk, and does not alter the balance of ingredients within the beverage.

The concept, introduced here by my beverage cooler, creates many new and exciting ways to prepare and serve traditional drinks. In stead of serving beverages with ice cubes, they may be served in partial slush form, for a drink that is not only colder, but will also remain constant in flavor and consistency, even after the slush melts. This would be a welcome change over ice cubes that produce a drink that is not only warmer, but degenerates in quality as the ice cubes melt. Other new beverage possibilities include serving wine, beer, soft drinks, and cocktails, in semi-slush form, at temperatures in the range of −6° C. to −1° C. (21°–30° F.), instead of a low of 0° C. (32° F.) attainable with ice cubes.

Cocktails such as martinis, having very high alcohol content, cannot be frozen into slush in the range of temperatures available to a household refrigerator freezer. They can, however, be served at any desired temperature upward of about −18° C. (0° F.) in my beverage cooler. A temperature of between −12° to −6° C. (10° to 21° F.), produces a very unique cocktail that is not only much colder than what can be attained using the conventional ice cube method, but is also much drier as a result of not having had contact with ice. The martini is colder, and drier than ever before, when prepared in my beverage cooler.

Ice cream, milk shakes, and frozen yogurt may also be produced in my beverage cooler, in much the same way that slushes are produced from carbonated beverages stated earlier. Milk, and cream, mixed with other flavorings, form the ingredients necessary to produce ice cream, and milk shakes. Since these ingredience are prerefrigerated, it usually takes less than 5 minutes to make a milk shake. Ice cream, or frozen yogurt, being more thoroughly frozen, takes about 10 minutes to produce. The ingredients are simply poured into the beverage cooler and stirred a few times until the desired texture is achieved.

In addition to the convenience of being able to produce ice cream, milk shakes, and frozen yogurt so easily at home, they can be made from the highest priced ingredients and still cost less than the cheaper brands of packaged ice cream and yogurt available in grocery stores. With this, the consumer has the added advantage of being able to modify recipes, or create new ones to suit their own preferences. A batch of these liquid ingredients is only minutes away from becoming a milk shake or ice cream with my beverage cooler. Frozen yogurt need only be transferred from the package container to the beverage cooler. As with all beverages served in my beverage cooler, the cold temperature of the ice cream or milk shakes is preserved for prolonged periods. This extends the amount of time the milk shake or ice cream may be consumed in a fresh, desired condition, and allows more flexibility in the time between preparing and serving.

In addition to the convenience and added pleasure my beverage cooler provides the consumer in enjoying the widest range of cold foods and beverages, it saves them money as well. Store bought slushes and milk shakes alone cost more than twice as much as those produced in my beverage cooler. With savings like these, the owner of my beverage cooler will recover the cost of the unit in a very short time, and continue to enjoy more savings with every use.

Use of my beverage cooler saves valuable refrigerator space, by eliminating the need to prerefrigerate beverages before use. Having the power to reduce room temperature beverages to their freezing point within minutes, allows them to be stored outside the refrigerator. Freezer space and labor are saved by eliminating the need for ice cubes.

Automatic ice makers, which are quite expensive, and occupy a large amount of freezer space, may also be eliminated along with the ice. The routine servicing requirements, along with the health hazards and foul tasting ice associated with ice making machines, need not to be tolerated further.

The crushed ice option, available on the more expensive automatic ice making machines, though capable of making a slush, produces one that is inferior to one made in my beverage cooler. Being comprised of tiny particles of ice, as described earlier, it ruins the quality of the beverage as the crushed ice melts, in the same way that ice cubes do.

Beside having the advantage of being able to make ice cream and milk shakes, and slushes from the beverage material, my beverage cooler never requires any kind of servicing, and poses no health hazard whatever in use, like automatic ice makers do.

Use of my beverage cooler has a positive impact upon the environment. Unlike ice cubes, which use more water and energy than are necessary to cool the beverage, and are discarded as waste afterward, my beverage cooler recovers, and reuses the water and energy within the refrigerant, for unlimited reuse. A single beverage cooler of my invention can cool hundreds and hundreds of beverages, over a period of years, using the same refrigerant.

A typical, 355 ml. (12 oz.) capacity beverage cooler of my invention can easily cool 1,000 beverages from room temperature to freezing, using the same 180 ml. (6 oz.) of water in the refrigerant, and produce no waste water. Using the conventional ice cube method of cooling, this same quantity of beverages would require making more than 7,500 ice cubes out of more than 230 lit. (61 gal.) of water. In addition to creating a considerable amount of labor, 230 lit. (61 gal.) of waste water is produced to consume only about 356 lit. (94 gal.) of beverage. This represents a very high water to product ratio.

For environmentally conscientious individuals, my beverage cooler will rapidly become the standard means for preparing and serving cold foods and beverages. Not only does my beverage cooler conserve natural resources that are normally wasted, it saves more resources during the life of the product than were originally expended in manufacturing the unit itself. In this sense, my beverage cooler is a very modern product indeed. Instead of simply making good use of natural resources, it goes a step further by representing a net gain for the environment.

My beverage cooler performs economically in a number of ways pertaining to the manufacture of the unit, by preferring the use of liquid refrigerants over gel refrigerants commonly used by the prior art. Gel refrigerants, in addition to being more expensive, are less durable than liquid refrigerants and have a shorter product life. Once manufactured, the freezing point of gel refrigerants cannot be altered without damage to the structure and durability of the gel like liquid refrigerants can. They have a higher toxicity level than most liquid refrigerants, and have a coefficient of expansion upon freezing that is about 3 times greater. The greater expansion volume of gel refrigerants causes more wear on prior art beverage coolers by increasing wall deformation, and disengagement of components that often results in permanent damage to the unit.

Gel refrigerants, due to their high viscosity, are much more difficult to load into the beverage cooler than liquid refrigerants. Because of this, the prior art had to develop special manufacturing processes to deal with this problem, adding to the cost and complexity of manufacturing their beverage coolers.

Further compounding the problem of loading the gel refrigerant into prior art beverage coolers, was the need for precise measuring of the refrigerant upon assembly, to allow proper room for the expansion air space. Too much gel, resulting in an undersized expansion air space, would fracture the walls of the compartment as the expansion volume exceeds that of the expansion air space. Too little refrigerant would reduce the cooling performance of the unit, to the extent that it would not perform according to design specifications. In either case, an improperly filled beverage cooler equals a high rate of returned merchandise, an unpleasant prospect for both manufacturers and distributors.

The prior art use of the expansion air space further impairs the durability of prior art beverage coolers by increasing internal pressure within the compartment containing the refrigerant. This increase of internal pressure occurs in response to expansion of the refrigerant when frozen, heat, and changes of elevation. The pressure build up threatens the integrity of the hermetic seal of the compartment, and contributes to deformation of the walls, all factors that reduce durability.

The prior art expansion air space adds bulk and contributes to the thermal inefficiency of the beverage cooler by requiring the walls of the refrigerant compartment to be thicker to resist deformation, and hence, less thermally conductive.

The expansion air space further inhibits the thermal efficiency of the beverage cooler when the refrigerant begins to melt. It appears around the upper portion of the inner container, depriving that critical area of refrigerant for cooling the most important part of the beverage, i.e. the surface.

My beverage cooler, through use of a unique expansion absorber, eliminates the need for an expansion air space. It aids maximum cooling of the beverage, by insuring full contact between the refrigerant, and upper portion of the inner container. The expansion absorber absorbs the excess volume of the expanded refrigerant, and eliminates the problem of internal air pressure within the refrigerant compartment. Coupled with the use of lower expansion liquid refrigerants, the expansion absorber allows my beverage cooler to be constructed with thinner compartment walls, for reduced cost and increased cooling speed.

My beverage cooler is easier and less expensive to manufacture than those of the prior art, with reduced probability of producing rejected units. Not having an expansion air space, the refrigerant compartment of my beverage cooler may simply be saturated, and require no special processes to insure precise measuring, like those of the prior art. The use of cheaper, more durable liquid refrigerants over gels reduces production costs, and simplifies manufacture by eliminating special processes required for loading gel refrigerants into the units. Liquid refrigerants also have the advantage of lower toxicity, and unlike gels, their thermal properties can be easily modified without affecting durability.

The improved thermal efficiency of my beverage cooler allows it to cool the beverage faster, and achieve lower temperatures using less refrigerant than prior art designs. In addition to enhanced performance, it allows the beverage cooler to be streamlined for more comfortable handling, and attractiveness, along with lower cost.

The special design criteria, introduced here by my invention, produces a beverage cooler of unprecedented cooling power and speed. Methods unavailable to the prior art may now be implemented toward the development of many new and exciting products, that would not have been feasible using prior art technology.

Unlike the current invention, the prior art had few methods available for altering the cooling characteristics of their beverage coolers. Reducing the wall thickness of the inner container could speed cooling, but was limited by the tendency of the expanded volume of the refrigerant to cause buckling of the container walls when frozen. Lowering the freezing point of the refrigerant could increase cooling speed to some extent, but also results in a loss of cooling power (enthalpy) of the refrigerant. The lower freezing point causes the unit to lose power sooner, and may encourage slush formation even when it is not wanted.

A thermal diffuser, unique to the current invention, alters the heat transfer characteristics of the refrigerant without changing its freezing point or enthalpy. When fitted around the inner container, a thermal diffuser made from a high thermal conductor such as aluminum, increases the cooling speed of the beverage. If the freezing point of the refrigerant is below that of the beverage, it increases the amount of slush formed within the beverage. A high conductor thermal diffuser also speeds freezing of the refrigerant in the refrigerator freezer for reduced preparation time. These capabilities are of particular advantage in industrial applications, such as in bars and restaurants, where rapid turnaround of drinking containers would demand fast preparation and fast cooling.

A thermal diffuser constructed of a low thermal conductor inhibits thermal transfer through the refrigerant. Fitted around the inner container, it slows cooling of the beverage and slush accumulation. Its primary advantage is that it allows the beverage to maintain its freezing temperature in a liquid state, without forming slush. Fitted around the inside of the outer container, it acts like an insulator, slowing thermal exchange with the outside environment.

The special proportions of the inner container of the current invention are an important contributor to the speed, depth, and uniformity of cooling of the beverage, hitherto unappreciated by the prior art. In addition to faster cooling speed, the elongated inner container reduces the amount of environmental heat entering the beverage through the opening. It distributes the refrigerant more evenly around the beverage, for cooling that is more uniform in temperature, throughout the beverage. Elongated inner containers required less refrigerant, and produce more slush than the typical tub shaped inner containers, commonly used in prior art beverage coolers.

The "tub" shaped inner containers of the prior art, on the other hand, produce beverage coolers that are slower at cooling, and require more refrigerant than my beverage cooler. They commonly have a warmer temperature on the surface of the beverage, than on the bottom, and have more difficulty producing and maintaining a slush consistency in the beverage.

The improved thermal relationship between the inner and outer containers in another feature that contributes to the thermal efficiency of my beverage cooler. The high thermal conductivity of both container walls speed freezing of the refrigerant within the compartment, by insuring heat extraction from both sides of the refrigerant. In addition to reducing the required freezing time in the refrigerator freezer, it tends to direct the expansion forces of the refrigerant vertically, into the expansion absorber, rather than the container walls that form the refrigerant compartment. This in turn allows the container walls to be made of thinner materials, which in addition to reducing their cost, increases their thermal conductivity and hence, their cooling speed.

The higher thermal conductance capacity of the inner container, insures a greater flow of thermal energy through the inner container than the outer container. This benefits cooling of the beverage by directing more of the cooling power of the refrigerant inward toward the beverage, rather than outward toward the room environment. It also helps relieve the inner container walls of some of the stresses resulting from expansion of the refrigerant. The higher conduction of the inner container, causes most of the refrigerant to freeze from the area around the inner container, outward. This directs the expansion volume of the frozen refrigerant away from the inner container, thereby relieving it of much of the stress that causes bulking of many prior art inner containers.

A typical prior art solution to the problem of buckling of the inner container walls, was to make them thicker than those of the outer container. The problem with this, is that it greatly slows the cooling speed of the beverage, particularly if the container is made of a low conductor such as plastic or glass. It gives the outer container a greater thermal conductance capacity than that of the inner container, causing most of the refrigerant to freeze from the outside, inward towards the inner container. This concentrates the expansion forces of the frozen refrigerant in towards the inner container, further increasing the thickness requirements of the walls.

Even when the wall thickness of both the inner and outer containers are the same, the outer container becomes the high thermal conductor, simply because of its larger surface area. Like the thinner outer container wall combination, it divers the expansion volume of the frozen refrigerant inward toward the inner container, by encouraging the refrigerant to freeze from the outside inward.

The universal prior art practice of making both the inner and outer containers of the same material, always results in the outer container being the high thermal conductor. In addition to the negative affects it has on the freezing sequence of the refrigerant already described, it wastes the cooling power of the refrigerant as well. The higher thermal conductance capacity of the outer container, coupled with its exterior exposure, encourage excess thermal exchange between the refrigerant, and room environment. The resultant power drain reduces the cooling duration of the beverage cooler, and increases the bulk requirements of the exterior insulation.

Prior art beverage coolers with metal outer containers, lose more refrigerant power to the environment than any other design combination. The high thermal conductance capacity of the metal attracts more environmental heat than any other material. The warmer outer container also interacts with the metal inner container to raise its temperature toward thermal equallibrium, further draining cooling power from the beverage. In addition to being thermally inefficient, metal outer containers cost the most and add significant weight to the beverage cooler.

A styrofoam outer container, joined to a plastic or metal inner container, is recommended by Moore et al U.S. Pat. Nos. 4,163,374 (1979), 4,299,100 (1981), 4,378,625 (1983). The weakness of styrofoam makes it difficult to join the two containers together with a connection that has suitable integrity. Wall deformation of the outer container, that results from expansion of the frozen refrigerant, causes disengagement of the components of the connection, in units in which the containers are not perfectly aligned. The wall deformation, along with the very low impact resistance of the styrofoam, increases the probability of cracks that leak refrigerant, and reduce the product life of the beverage cooler. It also makes them dependent on the use of more expensive and less desirable gel refrigerants.

The high thermal insulative properties of the styrofoam make the unit almost totally dependent upon the inner container for extraction of heat from the refrigerant during freezing in the refrigerator freezer. A beverage cooler with a styrofoam outer container may take as much as 5 times longer to freeze in preparation for use, than an uninsulated unit.

One of the excellent features of my beverage cooler, is the ability to join together an inner and outer container made of different materials, with a highly reliable, leak-proof connection. This allows each container to be constructed of material best suited for its specific application, independent of the other container. Each container may be constructed for optimum thermal, structural, and economic performance, in creating a beverage cooler, unsurpassed in quality.

The best combination, and one that is unique to my beverage cooler, includes an inner container, constructed of a high thermally conductive metal such as aluminum, together with an outer container, constructed of a low thermal conductor such as plastic. The aluminum inner container combines strength, light weight, corrosion resistance, and high thermal conductivity, for durability, along with rapid cooling speed. The outer container constructed of thin walled plastic, combines low cost, durability, and enough thermal conductivity to substantially increase the freezing speed of the refrigerant, without attracting undue heat from the environment, or interacting with the inner container. Together, this combination assures optimum performance of the beverage cooler.

A special compression seal connection of the current invention, allows the metal inner container to be joined to the plastic outer container with a strong, leak-proof seal of high integrity. The connection is unaffected by the different thermal expansion coefficients of the metal and plastic, and will not leak as a result. Unlike the design of Moore et al. described above, the connection can withstand movement from the expanding refrigerant, and does not require precise alignment between the inner and outer containers. The high integrity of the leakproof seal also allows the use of more economical liquid refrigerants instead of gels.

The assemblage of the inner and outer containers, along with the refrigerant sealed in the space between them, forms the cold cell assembly of the current invention. The cold cell assembly attaches to the exterior of the beverage cooler, which provides the unit with a thermally insulative, protective, and visually attractive exterior casing. Easy engagement and disengagement of the cold cell and exterior provides my beverage cooler with many important advantages, which will be discussed at length at a later time.

The cold cell, however, is the primary component responsible for the outstanding cooling performance of my beverage cooler. The chart shown in FIG. 16 is a comparison between the cooling performance of the current invention and those typical of r prior art designs. None of the test units had exterior insulation, and consisted of an inner and outer container with refrigerant in the space therebetween. All of the units were tested with 355 ml. (12 oz.) of tap water, a temperature of 21° C. (70° F.). Each unit contained 180 mi. (6 oz.) of a liquid refrigerant made from a 5.5% solution of sodium chloride and water. The freezing point of the refrigerant mixture was 3° C. (26° F.). The temperature readings were taken from the middle of the beverage, at a depth of 25 mm. (1"). The wall thickness of all of the test unit inner containers was 0.8 mm. (0.025").

Referring now to the chart shown in FIG. 16, the ascending solid line indicates the rise in temperature of a bottle of prerefrigerated beer left standing on a kitchen counter. The bottle was removed after several hours in a household refrigerator, with a temperature of 3° C. (37° F.). As the line indicates, the subsequent rise in temperature is rapid, rising 5° C. (9° F.) in about 20 minutes, with a temperature of 10° C. (50° F.) being achieved in just 30 minutes!.

The uppermost solid line on the chart (FIG. 16) indicates the performance of a typical prior art beverage cooler with a plastic inner container. Having a diameter of 70 mm. (2.75") and a height just over 100 mm. (4"), the ratio of height to diameter is 1.5, making this configuration what I have referred to earlier as "tub shaped". As we see from the chart, a beverage cooler with an inner container of this configuration is very slow for cooling the beverage. It took nearly 12 minutes to catch up with the bottle of beer, at a not-so-cold temperature of 6° C. (43° F.). It took about 20 minutes for it to achieve its last few degrees around 0° C. (32° F.). While this low temperature is satisfactory, it takes too long to achieve, making a beverage cooler of this design too slow to be of practical use for cooling unrefrigerated beverages.

The dashed line indicates the performance of the beverage cooler of the current invention. It is similar in construction and material as the tub shaped prior art beverage cooler already described, with the exception that the inner container is 57 mm. (2.25") in diameter and 114 mm. (5.63"). This gives us a height equal to 2.5 diameters. We can see from the chart what a dramatic affect the inner container proportions have on the cooling speed of the beverage! The simple act of changing the height to diameter ratio from 1.5 to 2.5, made the latter unit achieved cold temperatures from 5 to 10 minutes sooner than the prior art unit! This was achieved with the same quantity of refrigerant, and same inner container wall thickness.

The lower solid line on the chart (FIG. 16), indicates the performance of a beverage cooler, also of the current invention. It is similar in every detail to the other beverage cooler of the current invention just described, with the exception that the inner container is made of aluminum instead of plastic. The change of material from plastic to aluminum alone accounts for an increase of about 2 minutes in the cooling speed of the beverage. Another advantage the aluminum inner container has over the plastic one, is that its cooling speed and depth may be further accelerated with the addition of a thermal diffuser made from a high conductor such as aluminum.

The dotted line at the very bottom of the chart (FIG. 16) indicates the performance of the beverage cooler of the current invention just described, with the aluminum inner container fitted with a thermal diffuser of the current invention. The thermal diffuser used was of moderate power, constructed of an aluminum mesh that covered a little more than half of the exterior of the inner container. The mesh weighted about 3 g. (0.125 oz.).

As the chart shows, the beverage cooler fitted with the thermal diffuser, gains yet another 2 or 3 minutes on the speed of the plain aluminum container. The low temperature of 0° C. (32° F.), achieved in 16 minutes, took only 8 minutes when fitted with the thermal diffuser. In addition, the beverage cooler fitted with the thermal diffuser went on to achieve and maintain a low temperature of −1° C. (30.2° F.) at 10 minutes, as a result of the formation of ice on the thermometer probe! Comparing this performance with that of the bottle of beer, we see that at 6 minutes, the beverage cooler fitted with the thermal diffuser has begun to out perform it. At 9 minutes, the beverage cooler has achieved a temperature that is about 6° C. (10° F.) lower than that of the bottle of beer and continues to hold the low temperature of −1° C. (30° F.), as the temperature of the beer continues to rise. At 30 minutes, near the end of most beverages, the prerefrigerated bottle of beer is at 10° C. (50° F.), about 11° C. (20° F.) warmer than the beverage temperature within my beverage cooler! This unit continued to maintain the beverage temperature at or below 0° C. (32° F.) for more than 90 minutes.

A prerefrigerated beverage at 3° C. (37° F.) is transformed into a slush almost instantly when poured into a beverage cooler like the one described above. After the beverage is poured into the beverage cooler, a layer of slush, about 6 mm. (0.25") thick adheres along the walls of the inner container. The central portion or "core" of the beverage remains liquid, yet rapidly achieves the freezing temperature of the beverage. The liquid portion of the beverage may then be consumed for a very unique and delicious drinking experience. Most beer, wine, and soft drinks may be consumed in liquid form, at around −2° C. (28° F.), instead of upwards of 3° C. (37° F.) from the refrigerator freezer. If desired, the entire beverage may be converted to slush by scraping the slush free of the walls and stirring it in with the liquid portion. The resultant slush consistency is such, that it requires removal with a spoon and is too thick to pour.

In contrast to the very rapid cooling performance of my beverage cooler, a typical prior art beverage cooler, if able to produce slush at all, does so very slowly. The "slush mug" of Devlin's, U.S. Pat. No. 3,715,895 (1973), required up to 1065 ml. (36 oz.) of refrigerant, yet still took up to 10 minutes to produce a slush from prerefrigerated beverages! As we can see, the negative influences of the poorly designed "tub shaped" inner container of the prior art, cannot be overcome, even with larger amounts of refrigerant!

Another advantage of my beverage cooler, is that it is much more hygienic than ordinary drinking containers. The low operating temperature of my beverage cooler inhibits the growth and propagation of bacteria and viruses in the beverage, and on the walls of the inner container. The inner container, due to its high thermal conductivity, rapidly assumes the temperature of the refrigerant in contact with it. This effectively sanitizes the inner container, making it too cool to permit microbial growth and reproduction, along with the beverage. Unlike ordinary drinking containers, that breed increasing numbers of germs and bacteria, my beverage cooler holds them in suspension, prohibiting their proliferation. This includes not only strains that cause food spoilage, but also those that cause illness. This is of particular benefit to households, where contamination of drinking containers often leads to the spread of illness among family members. With my beverage cooler, the household drinking container need not be a major contagion of illness.

Other advantages of the self sanitizing inner container, is that it provides added convenience and labor savings, by requiring less washing than ordinary drinking containers. If promptly returned to the refrigerator freezer after each use, my beverage cooler need only be rinsed with tap water, and need not be washed with detergent to keep it acceptably free of germs. A weekly detergent washing is usually more than sufficient, regardless of how many times the beverage cooler has been used. If on the other hand, the beverage cooler is being prepared for use by subjecting it to liquified gases in the cryogenic state, then detergent washing is never required, as this causes a full sterilization of the inner container, killing all microorganisms present. This is of particular benefit in industrial applications such as bars and restaurants, where rapid sterilization of the beverage cooler, concurrent with freezing of the unit, requires less time than washing conventional drinking containers that have no refrigeration capability.

Versatility and adaptability are also among the countless objects and advantages that describe my beverage cooler. Easy detachment of the cold cell from the rest of the unit allows a single beverage cooler to be retrofitted with a variety of replacement cold cells, each with a specialized function. Though a standardized cold cell can produce any cold food or beverage consistency, replacement cold cells may be used to enhance certain cooling characteristics, best suited for specific uses. The cooling speed, and depth of temperature may be modified to best suit the production of ice cream, frozen yogurt, slushed drinks, or cold liquid beverages, or for greater cooling duration in outdoor use. An easily detachable cold cell also allows the beverage cooler to be upgraded in accord with future advances in the design of the cold cell.

Conversely, easy detachment of the cold cell allows a single beverage cooler to be fitted with a variety of attractive and utilitarian exteriors. Instead of having a beverage cooler with multiple replacement cold cells, a consumer may choose rather to have a single unit with multiple replacement exteriors. Since the exterior provides the beverage cooler with its decorative appearance, a single unit can appear in a variety of colors and designs, to match domestic decorative schemes. One design or color may be suited for kitchen use, and another for dining room or living room use. Special exteriors may also be made available for enhancement of a party or holiday atmosphere.

Since the exterior also provides the beverage cooler with a protective, and thermally insulative exterior, various designs can be made available to preserve cooling power for extended operation. A beverage cooler, normally designed for indoor use, can be retrofitted with a replacement exterior that is more impact resistant, and provides more thermal insulation, to adapt the unit for use outdoors.

Another option for adapting an indoor beverage cooler for outdoor use, is to fit and insulative jacket over the exterior, and a snap-on cover over the mouthpiece. The insulative jacket provides added impact protection in addition to extra thermal insulation for protracted operation. The snap-on cover makes the unit spillproof, and also provides added thermal insulation. For this small additional cost, the consumer can take the beverage cooler to work, or on recreational outings, and enjoy all of the high quality to cold foods and beverages outdoors that they do at home.

The manufacturer and marketer of my beverage cooler also benefit from the detachable cold cell feature of the current invention. In addition to the advantages of treating the beverage cooler, cold cell, and exterior as three separate markets, they can be coordinated together for maximum benefit to all. The cold cell assembly, which may account for more than 75% of the total cost of the beverage cooler, can be produced in high volume to get the best unit cost. The large inventory of cold cells will then be fitted with a wide variety of lower cost exteriors of various styles and colors, produced in lower quantities, that serve as attractive packages or "vehicles" to move the cold cells. In addition to offering a wider selection to the buyer and consumer, it allows the manufacturer and distributor a low cost means for "feeling out" what designs and colors are most popular and likely to sell. In this way, the inventory of cold cells, which represent the larger monetary commitment, can be shifted in the direction of the popular styles and colors, and are not fitted to the exteriors until orders are placed. This allows current market demand, rather than projections based on past trends determine which exteriors will be fitted to the cold cells.

These suggestions, for the commercial development of my beverage cooler, are but a few, considering how many new products can be derived from the concepts articulated here. The capability of producing any cold food or beverage of the highest quality, conveniently and at lower cost, make my beverage cooler unsurpassed in utility, and versatility as a household appliance. The truly powerful thermal performance, and simplicity of operation, also make it idea for use in the bar and restaurant industries, in addition to the home.

In conclusion, it is important to recognize how incredibly large the potential customer base is for my beverage cooler, and its related products. Anyone and everyone who enjoys ice cream, milk shakes, sherbert, and frozen yogurt is a potential customer. In addition, anyone and everyone who enjoys cold beverages of any kind, whether in liquid or slush consistency including water, fruit juice, soft drinks, tea, beer, wine, or cocktails is also a potential customer of my beverage cooler; and that means just about everyone!

Further objects and advantages of my invention will become apparent from consideration of the drawings, and ensuing description of it.

Figure 1:
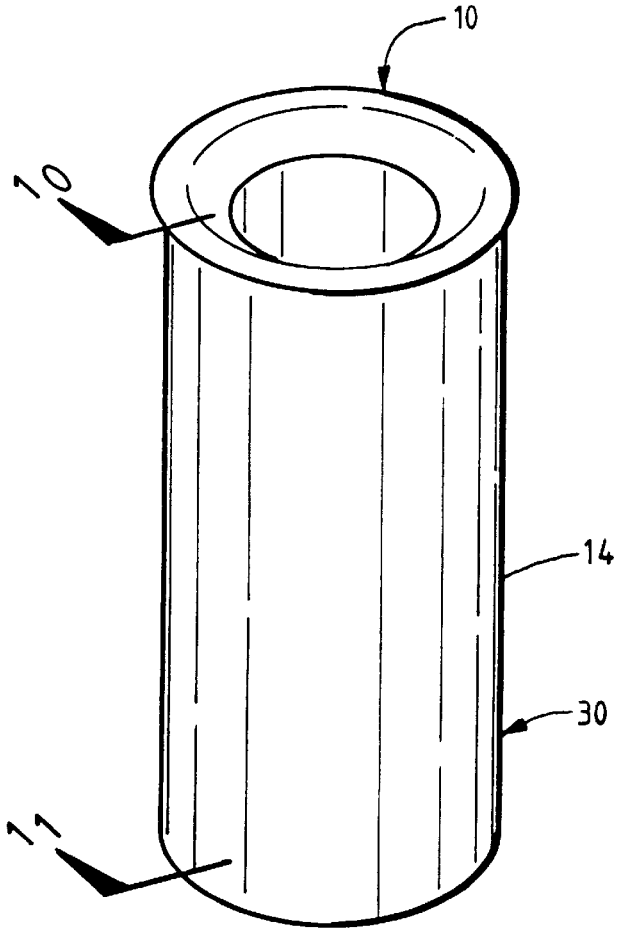
FIG. 1 is an isometric view of the fully assembled beverage cooler.

| Reference Numerals In Drawing | |
|---|---|
| 10 mouthpiece | 12 cold cell |
| 14 exterior cup | 16 inner container |
| 18 threaded fastener | 20 threaded fastener |
| 22 seal cap | 24 seal washer |
| 26 inner container flange | 28 thread seal |
| 30 beverage cooler | 32 beverage |
| 34 thermal diffuser | 36 mouthpiece rim |
| 38 dead air space | 40 outer container |
| 42 refrigerant | 44 seal cap lip |
| 46 expansion absorber spacer | 48 expansion absorber |
| 50 threaded fastener | 52 seal washer |
| 54 outer container lip | 56 seal gasket |
| 58 refrigerant compartment | |
| 64 snap-on cover | 66 straw |
| 68 insulative exterior | 70 outdoor beverage cooler |
| 72 snap-on cover tab | 74 straw port |
| 76 straw cap | 78 snap-on cover rim |
| 80 wrist strap | 82 air vent |
| 84 bead positioner | 86 outer shaft |
| 110 mouthpiece | 112 cold cell |
| 114 exterior tube | 120 positioning groove |
| 126 inner container flange | 130 beverage cooler |
| 136 mouthpiece rim | 140 outer container |
| 150 snap-on bead and groove fastener | 154 outer container lip |
| 156 seal-gasket | 158 fastener seal |

DESCRIPTION OF THE PREFERRED EMBODIMENTS

Figure 5:
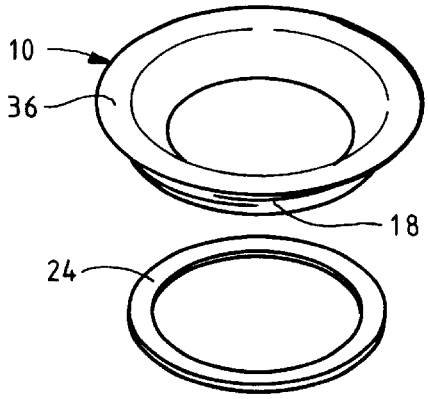
FIG. 5 is an exploded isometric view of the component assembly of the mouthpiece.

Referring now to the drawing figures, a beverage cooler 30 is comprised of a mouthpiece 10 (FIGS. 1,2,& 5) constructed of a plastic, commonly used in plastic drinking containers and tableware. Polypropylene, polyethylene, melamine, polyvinyl chloride, butyrate, styrene, and acrylics are acceptable choices.

Figure 2:
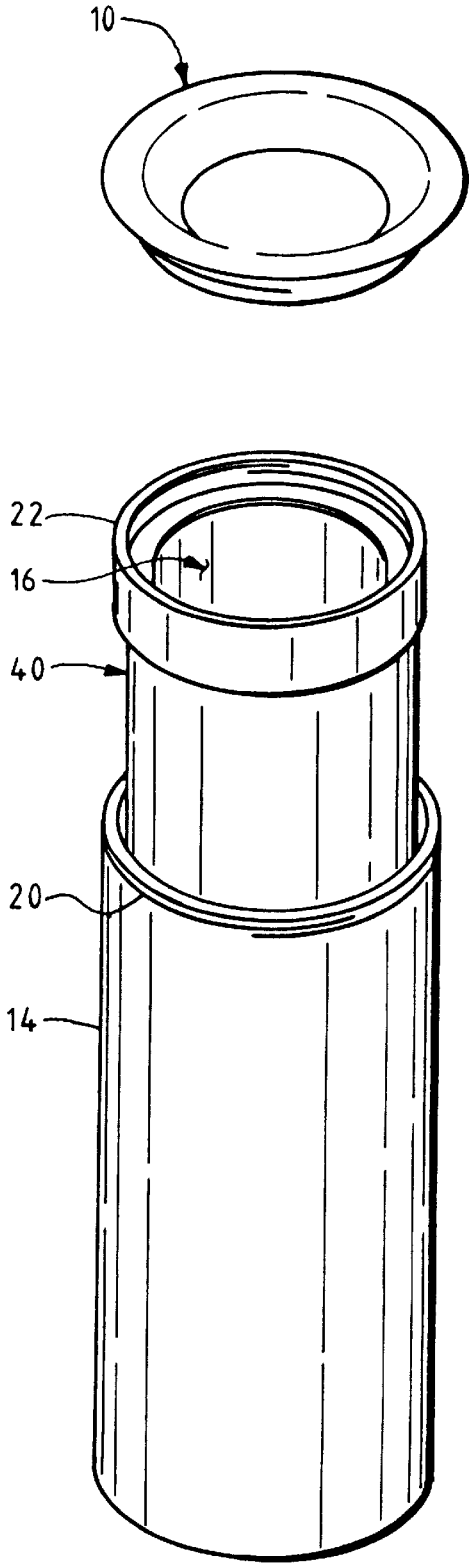
FIG. 2 is an exploded isometric view of the component assembly of the beverage cooler.

The interior of mouthpiece 10 (FIGS. 5 & 10), is concave in contour, beginning at the top inside portion, sloping inward and downward, concluding an opening at the bottom mouthpiece 10. The interior of mouthpiece 10 has a volume equal to 10%–25% of the volume of an inner container 16 (FIG. 2).

A mouthpiece rim 36 (FIGS. 5 & 10) overlaps the top edge of an exterior cup 14, and is attached with a threaded fastener 20. Mouthpiece rim 36 is radiused along the outside lower edge, for attachment of a snap-on cover 64.

Figure 10:
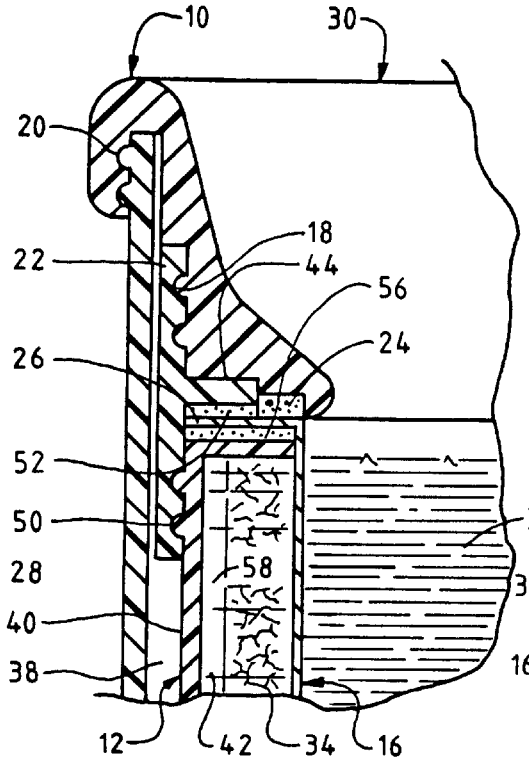
FIG. 10 is an enlarged section view of the upper connections of the beverage cooler.
Figure 12:
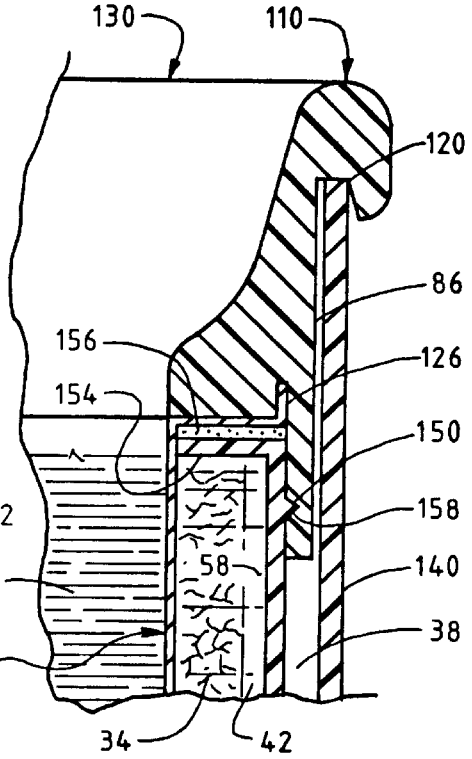
FIG. 12 is an enlarged section view of the upper connection of an alternative design for a beverage cooler.

Mouthpiece 10 (FIGS. 1 & 2) also attaches to a cold cell 12 with a threaded fastener 18 (FIG. 10). Threaded fasteners 18 and 20 may be standard coarse threads, commonly used on bottles and jars. Threaded fastener 18 is positioned to cause compression of a seal washer 24 between the underside of mouthpiece 10 and the top of an inner container flange 26 when tightened down.

Seal washer 24 (FIGS. 5 & 10) may be constructed of a compressible rubber or plastic, such as is commonly used for water tight seal joints on jar lids.

Exterior cup 14 (FIGS. 1 & 2) may be constructed of a plastic commonly used in drinking containers and tableware like those recommended for mouthpiece 10. A wall thickness of between 0.5 mm–3 mm (0.020"–0.120") is practical for most applications. As previously stated, exterior cup 14 is fitted to mouthpiece 10 by threaded fastener 20 (FIGS. 2 & 10).

Cold cell 12 assembly (FIGS. 3 & 4) comprises an outer container 40, an expansion absorber 48, a refrigerant 42, inner container 16, a thermal diffuser 34, a seal cap 22, a seal washer 52 and a seal washer 56. Cold cell 12 is detachable from the rest of beverage cooler 30 by detachment of mouthpiece 10 by threaded fastener 18 located on seal cap 22 (FIGS. 2,4, & 10).

Inner container 16 (FIGS. 2,4,8 & 9), as implied, forms the interior container of beverage cooler 30. It may be constructed of any solid polymer, such as glass, ceramic, or plastic, commonly used for drinking containers and tableware. The plastics previously recommended for mouthpiece 10 may also be used in the construction of inner container 16. Aluminum, however, is the preferred material for construction of inner container 16. The 99% pure and above grades of aluminum are preferred for their high thermal conductivity and corrosion resistance. Other metals with similar properties may also be used, but often have higher cost. The wall thickness of inner container 16 may be between 0.10 mm.–0.80 mm. (0.004"–0.032"). The interior capacity should approximate that of a standard sized beverage, with an excess not exceeding 5%.

Figure 16:
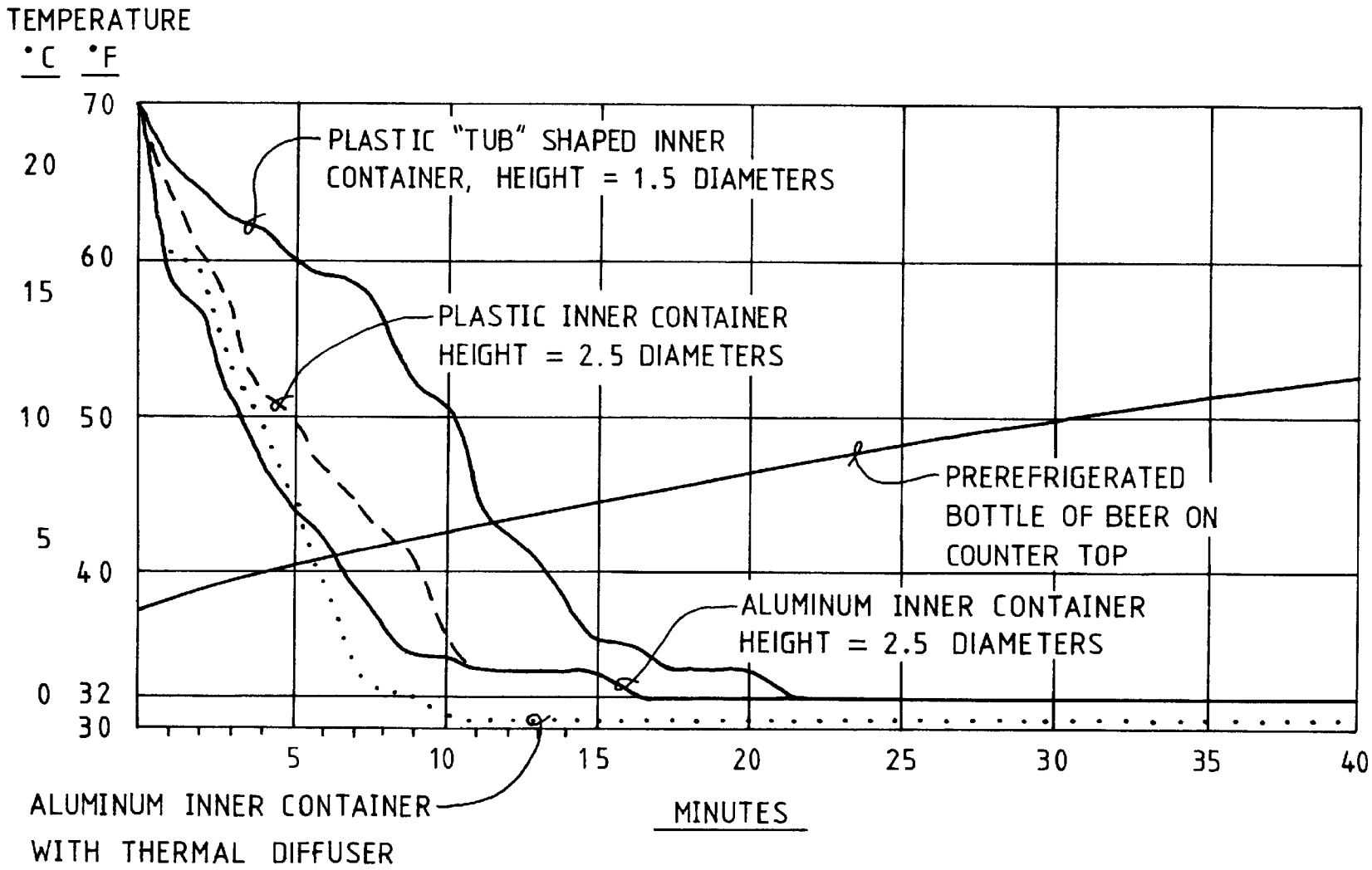
FIG. 16 is a chart showing the performance of beverage coolers of the current invention and the prior art.

Inner container 16 should have an interior height at least two times the inside diameter for cylindrical shaped containers. For rectangular and ovular shaped inner containers 16, an interior length at least two times the width through the cross section is preferred (FIGS. 10–13 viewed together as if one cross sectional view shows one possible arrangement). A highly efficient beverage cooler 30 for example, may be produced using a 2½:1 inner container 16 proportionment as demonstrated in the performance chart (FIG. 16), where progressive elongation is here shown to lead to a progressively faster unit.

A refrigerant compartment 58 (FIGS. 3,10 & 11) is formed from the inside wall of inner container 16 and the inside wall of outer container 40. In addition to these two compartments, refrigerant compartment 62 contains refrigerant 42, expansion absorber 48, and thermal diffuser 34. Beverage coolers 30 designed to cool an unrefrigerated beverage 32 should have refrigerant compartment 58 with an interior volume equal to at least 25% of the volume of inner container 16. Beverage coolers 30 designed to cool single prerefrigerated beverages require a smaller refrigerant compartment 58. The width of refrigerant compartment 58 should not exceed 10 mm. (0.375") without the addition of thermal diffuser 34. Refrigerant compartment 58 is hermetically sealed, and made permanent by attachment of seal cap 22 to outer container 40 (FIG. 10).

Refrigerant compartment 58 should be kept devoid of free air. Two methods of filling refrigerant compartment 58 with refrigerant 41 are therefore recommended. The first method involves assembling cold cell 12 (FIGS. 3 & 4) while submerged in a vat of refrigerant 42. The other method involves partial filling of outer container 40, sufficient to cause a slight overflow of refrigerant 42 when inner container 16 is inserted into outer container 40.

With seal cap 22 (FIGS. 3 & 4) fully attached to outer container 40 with a threaded fastener 50, inner container flange 26 is positioned between an outer container lip 54 and a seal cap lip 44 and press fit between seal washer 52 and a seal gasket 56, mounted on the top and underside of inner container flange 26 (FIG. 10). Threaded fastener 50 (FIG. 12) is positioned to cause compression of seal washers 52 and 56 when fully attached.

Seal gaskets 52 and 56 (FIGS. 4, 5, 9 & 10) may be constructed of a compressible rubber or plastic material of the type that is commonly used to seal the lids of bottles and jars.

Figure 7:
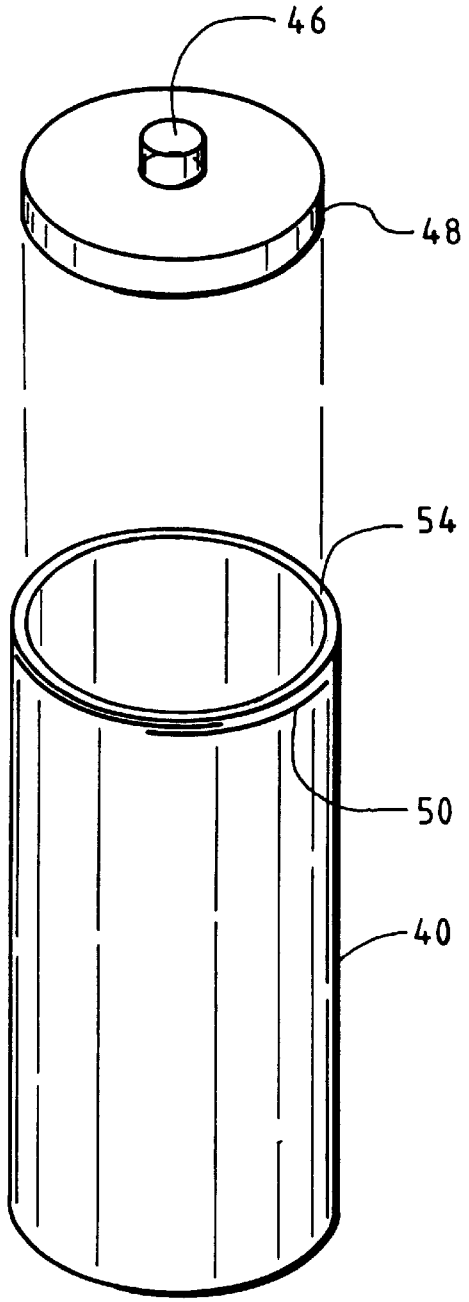
FIG. 7 is an exploded isometric view of the outer container and expansion absorber.
Figure 8:
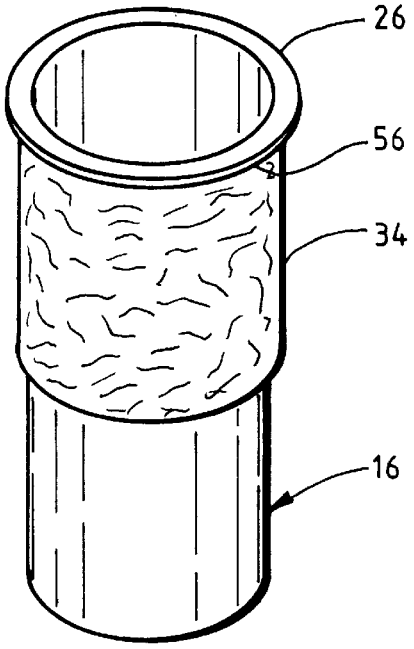
FIG. 8 is an isometric view of a fully assembled inner container.
Figure 9:
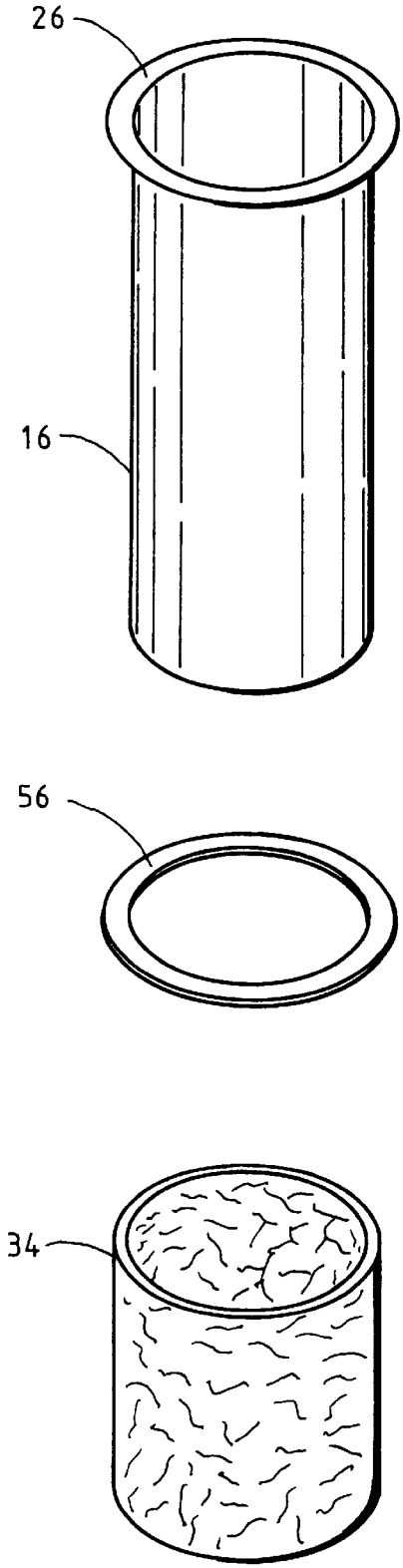
FIG. 9 is an exploded isometric view of the component assembly of the inner container.

Threaded fasteners 50 (FIGS. 7 & 10) may be a standard coarse thread type, commonly used on plastic jars and bottles. Threaded fastener 50 is made permanent by a thread seal 28. Thread seal 28 may be a weld, adhesive, or mechanical locking device that makes detachment of threaded fastener 50 impossible after assembly.

Refrigerant 42 (FIGS. 9, 12 & 13) may be plain water, or a mixture of water and propylene glycol, alcohol, or mineral salts to achieve a lower freezing temperature. The proportions of water vary in these mixtures to produce a freezing point below that of water. A freezing point below −2.3° C. (28° F.) is adequate to produce slush from most soft drinks. Ice cream and milk shakes are made best with refrigerant 42 mixture with a freezing point near −6° C. (21° F.). For general use, a 10% solution of propylene glycol and water, producing a freezing point of about −3.3° C. (26° F.), has been found to be satisfactory for about all applications. Similar results are obtained using a 5.5% solution of sodium chloride and water. Higher water content solutions such as these, however, may require the addition of a mold inhibiting compound.

Refrigerant 42 fills refrigerant compartment 58, and soaks thermal diffuser 34. Gel refrigerants 42 may also be used, however, their inability to effectively saturate thermal diffuser 34 material may result in a loss of refrigerant 42 volume. If this is not a concern, thermal diffuser 34 may be installed as usual, or pulverized and mixed into the gel. When frozen, refrigerant 42 mixtures having a freezing point of −3.3° C. (26° F.), contain 3 to 4 times the energy necessary to reduce an equal volume of beverage 32 from about 22° C. (72° F.) to 0° C. (32° F.). After the low temperature of beverage 32 has been achieved, the remaining energy within refrigerant 42 is used to maintain the low temperature of beverage 32.

The amount of time refrigerant 42 is able to maintain the low temperature of beverage 32, depends mainly upon the particular refrigerant 42 mixture within cold cell 12, and the amount of thermal insulation surrounding it. The thermal insulation includes exterior cup 14, snap-on cover 64, a dead air space 38, and an insulative exterior 68.

Refrigerant 42 within cold cell 12 will maintain the low temperature of beverage 32, 6 times its volume, for about one hour if uninsulated. With the addition of the insulating components described above, the duration of refrigerant 42 can be extended to about two hours. Increasing the insulation beyond this range generally has diminishing returns, and is impractical due to excess bulk of the extra insulation.

Thermal diffuser 34 (FIGS. 8, 9, 10 & 11) may be constructed of a high thermally conductive metal fabric, such as aluminum, or copper "wool" or "mesh". Being saturated in refrigerant 42, thermal diffuser 34 should be resistant to chemical attack from refrigerant 42. Thermal diffuser 34 should be in direct contact with inner container 16 on the inside surface, and the mass distributed evenly throughout the adjacent layer of refrigerant 42. The full outer surface of inner container 16 may be covered for maximum results, however, coverage of the upper half alone often provides sufficient increase in the cooling speed of beverage 32. Thermal diffuser 34 made from aluminum wool or mesh, equivalent to 1% of the volume of refrigerant 42, will increase thermal absorption of refrigerant 42 by about 25%. Maximum performance of thermal diffuser 34, with full coverage of inner container 16 is achieved when solid volume of thermal diffuser 34 does not exceed about 10% of the volume of refrigerant 42.

Thermal diffuser 34 may also be constructed of a low thermally conductive polymer fabric is made from plastic, rubber, glass, ceramic, mineral fibers, or sponge to reduce the thermal absorption rate of refrigerant 42. The rate of thermal absorption of refrigerant 42, depends upon the thermal conductivity of the fabric, and the degree to which thermal diffuser 34 is saturated.

Expansion absorber 48 (FIG. 6, 7, 10 & 11) is a compressible ring or disc shaped pad, that is fitted to either, or both ends refrigerant compartment 58. It should, be constructed of a flexible elastomer such as rubber, or a similar polymer such as plastic, or other material that is resistant to the solvent effects of refrigerant 42 in contact with it. Expansion absorber 48 may be made of closed cell foam, or a hollow structure with flexible walls. The walls of expansion absorber 48, whether cellular foam, or a hollow structure, should be sufficiently strong to resist rupture during compression, and also allow a high degree of dimensional recovery back to the original, non-compressed condition.

A spacer 46 is fitted between expansion absorber 48 and inner container 16. It may be constructed of any material that is resistant to the solvent effects of refrigerant 48. Although any configuration could be used, expansion absorber spacer 46 should be rod shaped, with a diameter not exceeding about 25 mm. (1"). Expansion absorber spacer 46 should be part of, or permanently affixed to either, or both expansion absorber 48, or inner container 16. Outer container 40 (FIGS. 3, 4, 6, 7, 8 & 10) may be constructed of any solid polymeric. Plastic, elastomers, rubber, ceramic, or glass, of the type that is commonly used in jars and bottles designed for storage of liquids is preferred. The material should have good resistance to the solvent effects of refrigerant 42. The wall thickness of outer container 40 should be made as thin as is practical without exceeding about 3 mm. (0.125") in thickness. The wall thickness should also be such, to permit a high degree of thermal transmission between refrigerant 42 on the inside, and the frigid environment on the outside, without exceeding the thermal transmission ability of inner container 16 in the same frigid environment.

Outer container 40 attaches to seal cap 22 with threaded fastener 50, and is made permanent by thread seal 28, for completion of cold cell 12 assembly.

Dead air space 38 (FIGS. 10 & 11) is the area between the outside of cold cell 12, and the inside of exterior cup 14. It is made up of room air that has been trapped inside of beverage cooler 30 when it is fully assembled. A uniform thickness, exceeding 2 mm. (0.08") around the outside of cold cell 12, and a volume exceeding 25% of the volume of refrigerant 42 is preferred.

Figure 11:
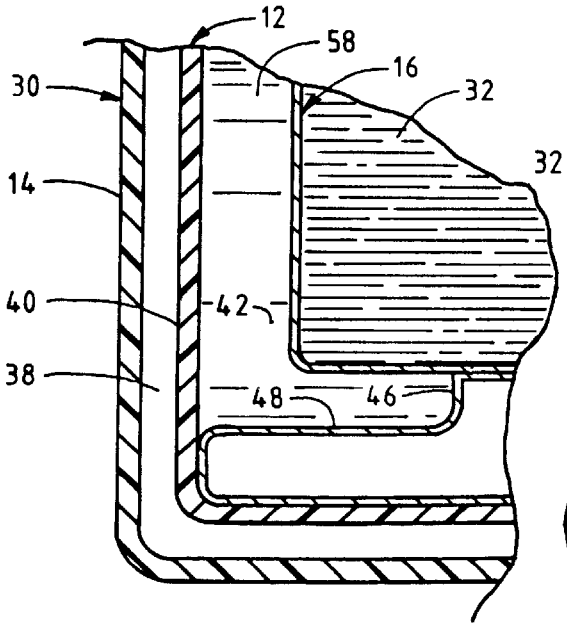
FIG. 11 is an enlarged section view showing the lower portion of the beverage cooler.
Figure 13:
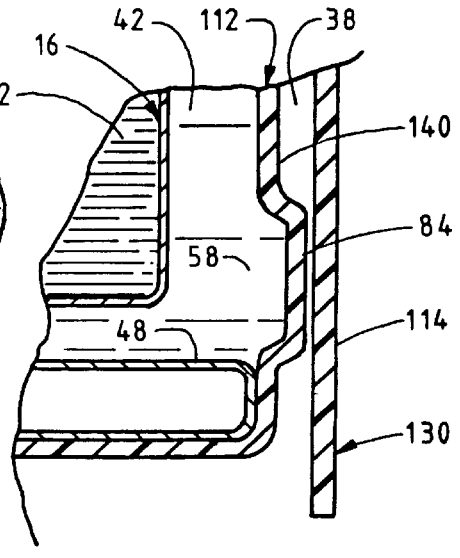
FIG. 13 is an enlarged section view showing the lower portion of an alternative design for a beverage cooler.

A beverage cooler 130 (FIGS. 12 & 13) may be constructed as an alternative embodiment of beverage cooler 30 of the preferred embodiment (FIGS. 10 & 11). The component specifications of beverage cooler 130 are the same as those in beverage cooler 30, with the exception that some have been eliminated, and others modified. Seal cap 22, threaded fasteners 18, 20, & 50, and seal washers 24, & 52 of beverage cooler 30 have been eliminated in beverage cooler 130 of the alternative embodiment. The following is a description of the replacements and modifications of beverage cooler 130.

In the alternative version, beverage cooler 130 (FIGS. 12 & 13) has a mouthpiece 110 which engages the top edge of an exterior tube 114, with a positioning groove 120 located on the underside of a mouthpiece rim 136. An outer shaft 140 of mouthpiece 110 engages the inside wall of exterior tube 114 with a nominal dimensional clearance of about 0.4 mm. (0.015") along the sides. The dimensional clearance, plus the lack of perfect concentricity of exterior tube 114, provide a friction type fit that is tight, but will allow exterior tube 114 to slide for insertion and removal from the rest of the unit.

Mouthpiece 110 and inner container 16 are permanently bonded together by embedment of inner container 16, and inner container flange 126 into mouthpiece 110. Mouthpiece 110 also attaches permanently to an outer container 140 with a snap-on bead and groove fastener 150.

The bead portion of snap-on bead and groove fastener 150 encompasses the outer rim of outer container 140 near the open end. A groove encompassing the inside rim of the lower portion of mouthpiece 110 is press fit onto the bead portion for a permanent fit. The height location of snap-on bead and groove fastener 150 is positioned to cause compression of a seal washer 156 between the top of an outer container lip 154, and the underside of mouthpiece 110. Snap-on bead and groove fastener 150 may be further sealed with a fastener seal 158.

Fastener seal 158 is a weld, adhesive, or mechanical locking device.

A bead positioner 84 (FIG. 13) surrounds the lower portion of outer container 140, and projects outwardly from the sides. The outside diameter of bead positioner 84 is approximately that of outer shaft 86 of mouthpiece 110, for a similar fit with exterior tube 114, described above.

Exterior tube 114 may be constructed of tubing made from the extrusion process. The nominal inside diameter of exterior tube 114 should be about 1 mm. (0.04") greater than the diameter of outer shaft 86, and bead positioner 84. Exterior tube 114 slides over cold cell 112, engaging positioning groove 120, and portions of outer container 86, and bead positioner 84, for a fit that is snug, yet allows sliding.

An outdoor beverage cooler 70 (FIGS. 14 & 15), is equipped with a snap-on cover 64, made from a flexible plastic such as polyethylene, polypropylene, or polyvinyl chloride, ect., commonly used in the construction of drinking containers and tableware, with a material thickness of about 1 mm. (0.04"). The interior portion of a snap-on cover rim 78 is contoured for a force fit over the exterior of mouthpiece rim 36. A tab 72 along the rim 78 of snap-on cover 64 projects about 6 mm. (0.25") beyond rim 78, to form a semicircle about 13 mm. (0.5") in diameter. A straw port 74 is sufficient in diameter to allow a friction fit with a straw 66.

Straw 66 may be constructed of plastic tubing, with a diameter of about 10 mm. (0.375"). A cap 76 made of similar material may be friction fit over the exposed end of straw 66.

An insulative exterior 68 may be friction fitted over the exterior of any beverage cooler 30 (130) version, to form outdoor beverage cooler 70. An air vent 82, more than 3 mm. (0.125") in diameter, is on the underside of insulative exterior 68. A wrist strip 80, made of woven fabric is attached to insulative exterior 68 by a sewn stitch, or adhesive.

Referring again to the drawing figures, a beverage cooler 30 (FIG. 1), is specially designed to cool a beverage 32 for immediate consumption.

Figure 14:
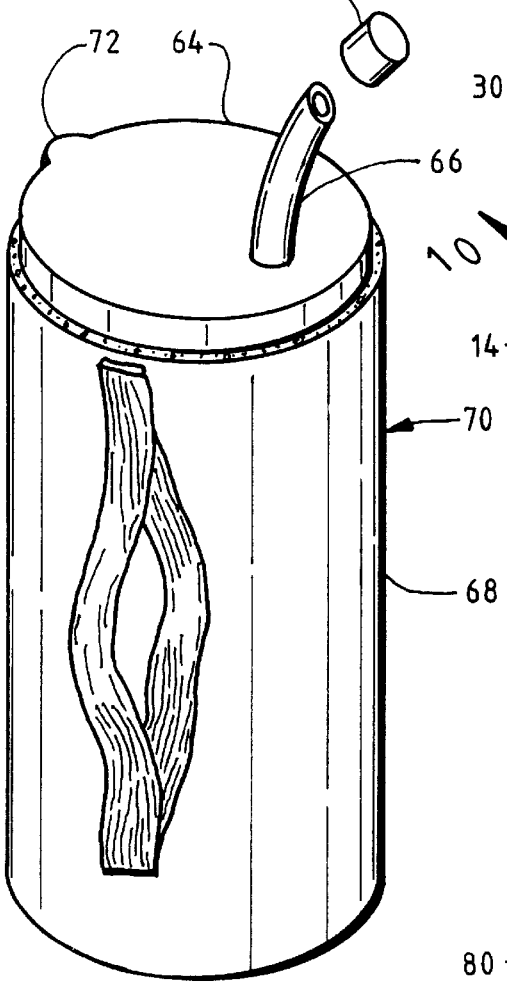
FIG. 14 is an exploded isometric view of a fully assembled beverage cooler, retrofitted for outdoor use.
Figure 15:
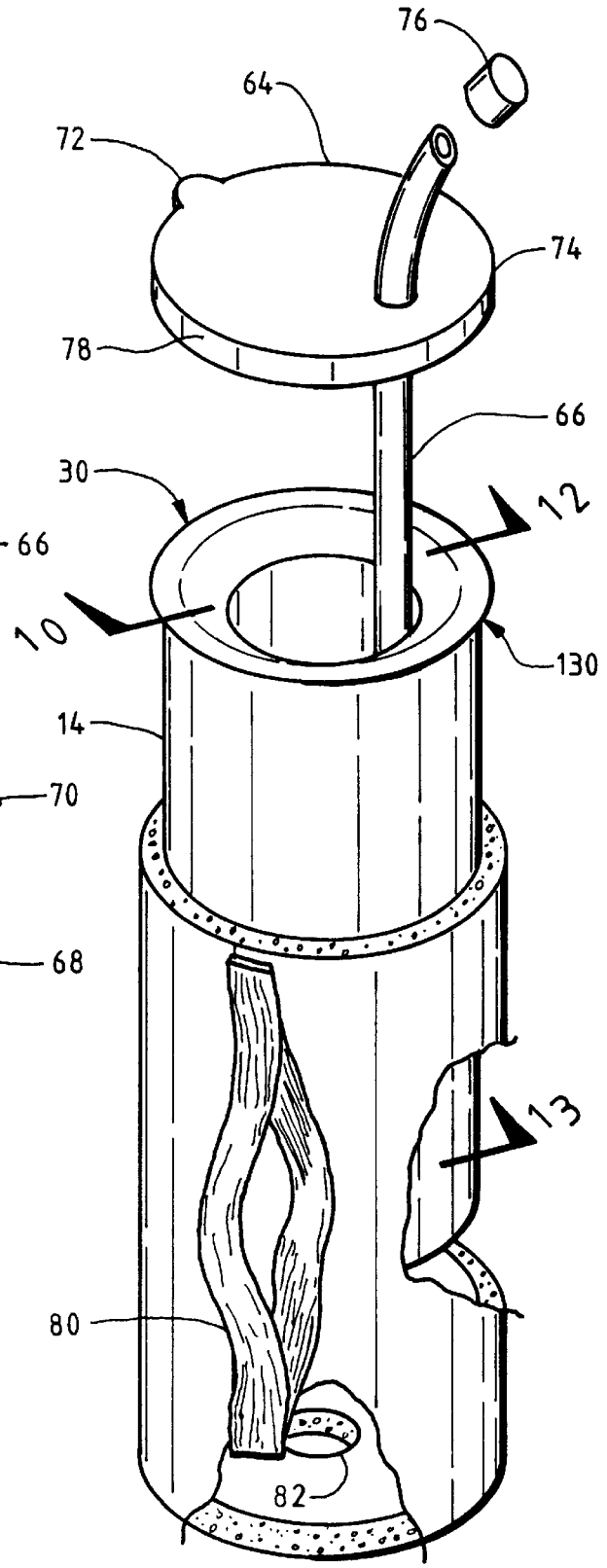
FIG. 15 is an exploded isometric view of the component assembly of a beverage cooler, retrofitted for outdoor use.

A mouthpiece 10 (FIGS. 1, 2, 3, 5 & 10) provides a thermally insulative cover for a cold cell 12. The interior of mouthpiece 10 provides extra capacity to contain a head of foam from beer and other carbonated beverages 32. A mouthpiece rim 36 is contoured for comfortable lip contact, and may be fitted with an optional snap-on cover 64 (FIGS. 14 & 15). A threaded fastener 20, located behind mouthpiece rim 36 provides quick and easy detachment of mouthpiece 10 from an exterior cup 14. Another threaded fastener 18, located at the lower edge of mouthpiece 10, allows quick and easy detachment from a cold cell 12. Mouthpiece 10 may also be color coordinated with exterior cup 14, to provide beverage cooler 30 with an attractive and decorative exterior.

A seal washer 24 (FIGS. 5 & 10) is compressed between the underside of mouthpiece 10, and the top of an inner container flange 26 to provide a leak proof backup seal for a seal washer 52.

Exterior cup 14 (FIGS. 1, 2, 10 & 11) forms the outer casing of beverage cooler 30, and encloses a dead air space 38 between it and cold cell 12. Exterior cup 14 contributes to the durability of beverage cooler 30 by supplying cold cell 12 with a protective covering. This allows the walls of cold cell 12 to be made thinner, which is not only more economical, but also reduces the amount of time it takes to freeze cold cell 12 in the refrigerator freezer. Exterior cup 14 is thermally insulative, and helps preserve the cooling power of beverage cooler 30. It inhibits the formation of water condensation that leaves water rings on furniture surfaces, and makes beverage cooler 30 dry, and comfortable to the touch. Threaded fastener 20, located at the top edge of exterior cup 14, provides quick and easy attachment of mouthpiece 10 for completion of beverage cooler 30 assembly. Exterior cup 14 may be color coordinated with mouthpiece 10 to give beverage cooler 30 an attractive and decorative exterior.

Cold cell 12 (FIGS. 2, 3 & 4) is the source of cooling power for beverage cooler 30. It is easily detachable from the beverage cooler 30 assembly, so that it may be frozen separately to reduce the required time in the refrigerator freezer. The detachment option also allows a single beverage cooler 30 to be fitted with a variety of replacement cold cells 12, for protracted operation, or for producing different cold foods or beverages 32. Though a standardized cold cell 12 design is able to produce any cold food or beverage 32 consistancy, the cooling characteristics necessary for specific items such as hard ice cream can be enhanced by modification of the design of cold cell 12. The detachable cold cell 12 option also allows a variety of different mouthpiece 10 and exterior cup 14 designs to be fitted to beverage cooler 30, to give it unlimited changes of appearance and function.

After freezing, cold cell 12 attaches to mouthpiece 10 with threaded fastener 18 (FIG. 10). Cold cell 12 and mouthpiece 10 assembly is then placed within exterior cup 14 (FIG. 2), and attached with threaded fastener 20 shared by exterior cup 14 and mouthpiece 10 (FIG. 10) Beverage cooler 30 is at this stage fully assembled and ready for use (FIG. 1). Beverage 32 is then poured into an inner container 16 within beverage cooler 30, and held during consumption.

Inner container 16 (FIGS. 2, 3, 4, 8 & 9) forms the innermost container of cold cell 12, and holds beverage 32 while it is being consumed. The material and dimensional proportions of inner container 16 induce rapid cooling of beverage 32, by maximizing the rate of thermal exchange between refrigerant 42 and beverage 32. It keeps them at, or very near temperature equilibrium, and helps retard the increase of beverage 32 temperature after refrigerant 42 has melted. The high thermal conduction capacity of inner container 16 also helps to relieve the walls of stresses imposed by expansion of the frozen refrigerant 42, by encouraging it to freeze outwardly, away from inner-container 16 walls. The low operating temperature of inner container 16 also prohibits the growth and propagation of microorganisms on the walls, and in beverage 32, for a drinking container that is self-sanitizing.

Inner container 16 may also be designed to generate a taller head of foam from carbonated beverages 32 than ordinary mugs and tumblers. Friction, generated between the frost that immediately forms on the walls of inner container 16, and beverage 32 being poured, agitates the bubbles, causing a greater than usual release of carbonation. The result is a taller head of foam. The effect is most dramatic when inner container 16 has a large surface area relative to volume, and with a lower freezing point refrigerant 42. Conversely, the raised head can be reduced by attaching a low conductor thermal diffuser 34 around inner container 16.

After beverage 32 has been poured into inner container 16, the subsequent release of carbonation is much lower than is typical in ordinary mugs and tumblers. This is due primarily to the absents of ice cubes in the beverage 32, and the sustained low temperature of beverage 32 held in inner container 16.

A refrigerant compartment 58 (FIGS. 3, 4, 10 & 11) forms the interior space between inner container 16, and outer container 40, and contains an expansion absorber 48, a thermal diffuser 34, and is filled to capacity with refrigerant 42. Inner container 16 and outer container 40 help speed freezing of refrigerant 42 in preparation for use, by extracting heat from both sides of refrigerant 42. The higher thermal transfer capacity of inner container 16, together with the lower thermal transfer capacity of outer container 40, help relieve the walls of refrigerant compartment 58 of much of the stress that results from expansion of the frozen refrigerant 42, by directing the expansion volume vertically, into expansion absorber 48, rather than into the walls of refrigerant compartment 58. This allows the walls of the refrigerant compartment 58 to be made thinner for better economy, and faster cooling.

Upon assembly, refrigerant compartment 58 is filled to capacity with refrigerant 42, and permanently sealed by attachment of a seal cap 22 which joins together inner container 16, and outer container 40, corresponding to the interior, and exterior walls of refrigerant compartment 58 respectively.

Seal cap 22 (FIGS. 2, 3, 4 & 10) attaches to outer container 40 with a threaded fastener 50 located on the lower inside rim of seal 22, and to mouthpiece 10 with another threaded fastener 18, on the upper inside rim.

Seal gasket 52 (FIGS. 4, 8, & 9) provides refrigerant compartment 58 with a hermetic seal. Seal gasket 56 (FIG. 10) is compressed between the underside of an inner container flange 26, and the top surface of an outer container lip 54, to prevent bypass of gas or liquid into, or out of refrigerant compartment 58.

Another seal washer 52 (FIGS. 4 & 10) provides a backup seal for seal washer 24, and seal gasket 56. Seal washer 52 is compressed between the underside of a seal cap lip 44, and the top side of inner container flange 26.

Inner container flange 26, seal cap lip 44, the top of outer container lip 54, and the underside of mouthpiece 10 (FIG. 1) all provide seal washers with a strong, and rigid encasement equipped with contact surfaces that are smooth, and flat for good bearing and fit during compression.

Figure 3:
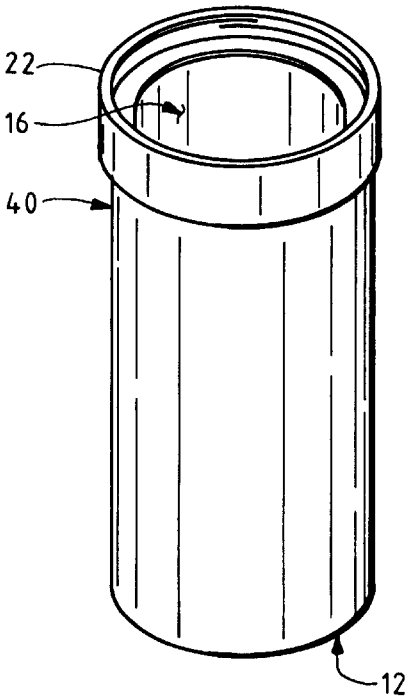
FIG. 3 is an isometric view of the fully assembled cold cell.
Figure 4:
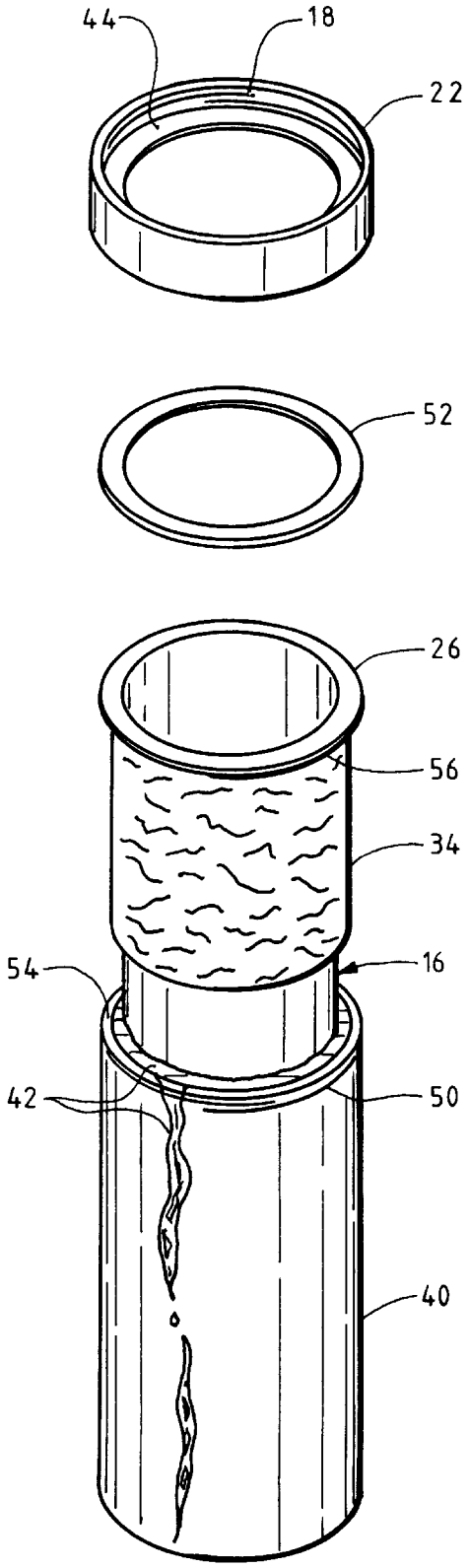
FIG. 4 is an exploded isometric view of the component assembly of the cold cell.
Figure 6:
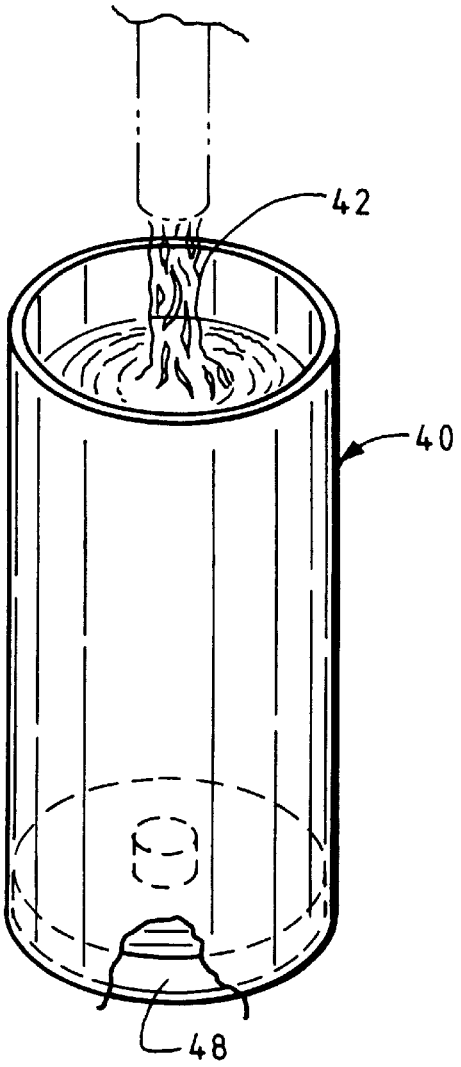
FIG. 6 is an isometric view of the fully assembled outer container.

Threaded fastener 50 (FIGS. 4 & 10) is permanently sealed with a thread seal 28, to prevent reentry into refrigerant compartment 58, for completion of cold cell 12 assembly (FIG. 3).

Refrigerant 42 (FIGS. 4, 6, 10 & 11) is the source of cooling power within cold cell 12. Usually a liquid or gel at room temperature, refrigerant 42 saturates thermal diffuser 34, and fills to capacity the remainder of refrigerant compartment 58.

Refrigerant 42 is frozen solid in preparation for use when cold cell 12 is placed in a frigid environment, such as a household refrigerator freezer. Beverage 32 is cooled, as heat is extracted through the walls of inner container 16, and absorbed by refrigerant 42, by energy supplied by the latent heat of fusion of the frozen refrigerant 42, and the temperature differential between beverage 32 , and refrigerant 42. In solid phase, refrigerant 42 is about 7 times more absorptive of thermal energy than in liquid phase, even at the freezing point. For this reason the solid phase condition of refrigerant 42 should be preserved as long as possible.

Upon freezing, refrigerant 42, being mostly water, expands to a larger solid volume. For this reason, refrigerants 42 with a lower coefficient of expansion are preferred. Liquid refrigerants 42, such as simple mixtures of water and propylene glycol, alcohol or mineral salts have a solid phase volume about 2 or 3% in excess of the liquid phase volume. Plastic "gel" refrigerants 42 may also be used, however they have an expansion volume closer to 10% in excess of the unfrozen volume. Other disadvantages of using gel refrigerants 42 is that they are more expensive, and more difficult to load into refrigerant compartment 58 than liquid refrigerants 42.

Thermal diffuser 34 (FIGS. 4, 8, 9 & 10) is placed within refrigerant compartment 58 to modify the heat absorbing properties of refrigerant 42, without changing the enthalpy (total head content) of refrigerant 42. Constructed of a high thermal conductor such as metal wool, or mesh, thermal diffuser 34 increases the rate at which refrigerant 42 absorbs heat from the surroundings. A lower conductor polymer such as glass, or plastic filament, produces thermal diffuser 34 that slows heat absorption of refrigerant 42.

A high conductor thermal diffuser 34 may be fitted around inner container 16 to speed cooling of beverage 32, and to increase congealment, and slush accumulation within the food or beverage 32 being consumed. It also reduces the time it takes to freeze refrigerant 42, when cold cell 12 is in the refrigerator freezer.

If a low beverage 32 temperature is desired without slush formation, a low conductor thermal diffuser 34 may be fitted around, the outside of inner container 16. This allows beverage 32 to be held at its freezing point in the liquid state without forming slush. Fitted around the inside wall of outer container 40, a low conductor thermal diffuser 34 slows heat absorption from the environment, creating an insulating effect within refrigerant which helps to preserve the thermal energy, and hence the congealed condition of refrigerant 42.

Expansion absorber 48 (FIGS. 6, 7, 10 & 11), located on either or both ends of refrigerant compartment 58, absorbs the expansion volume of refrigerant 42 when it freezes into a solid. This eliminates the danger of damage to the walls of refrigerant compartment 58 as refrigerant 42 undergoes its change of volume, and allows them to be made thinner for greater economy and increased thermal performance. Expansion absorber 48 allows full saturation of refrigerant compartment 58 with refrigerant 42, and eliminates the need for an expansion air space, or precise measuring of refrigerant 42 during manufacture.

An expansion absorber spacer 46 (FIGS. 4, 6, 7 & 11) is located between the top of expansion absorber 48, and the bottom of inner container 16. In addition to its regular function as part of expansion absorber 48 described above, its function is to position expansion absorber 48, and to keep it in place at the bottom of refrigerant compartment 58.

Outer container 40 (FIGS. 2, 3, 4, 6, 7, 10 & 11) forms the exterior of cold cell 12. Although constructed of material of relatively low thermal conductivity, it makes a significant contribution to the speed at which refrigerant 42 within cold cell 12 freezes in the refrigerator freezer. Because of the thin walls, and exterior exposure of outer container 40, it is able to benefit from the convective movement of air within the refrigerator freezer, in addition to thermal conduction for freezing refrigerant 42. The amount of heat extracted from refrigerant 42 through outer container 40 during freezing is less however, than the amount extracted through inner container 16. This is to avoid directing the expansion volume of the frozen refrigerant 42 in toward inner container 16.

When in use outside the refrigerator freezer, outer container 40 may be credited as thermal insulation, along with dead air space 38 and exterior cup 14, because of the low thermal conductivity of the material used to construct outer container 40.

Dead air space 38 (FIGS. 10 & 11) forms the area between the outside of attached cold cell 12, and the inside wall of exterior cup 14. Dead air space 38 provides the primary thermal insulation covering for cold cell 12. It preserves the cooling power of cold cell 12, and allows the outer surface temperature of exterior cup 14 to be nearer that of the room temperature, for more comfortable hand contact. Having no cost, and possessing excellent thermal insulating properties, dead air space 38 contributes to the economy and streamlining of beverage cooler 30 by requiring a lower volume of insulating material than is required using rubber or plastic foam insulation. Dead air space 38 is stripped away by removal of exterior cup 14 from beverage cooler (FIG. 2), to hasten freezing of cold cell 12 for use.

A beverage cooler 130 (FIGS. 12 & 13) may be constructed as an alternative embodiment of beverage cooler 30 of the preferred embodiment (FIGS. 10 & 11). The function of the components of beverage cooler 130 are the same as those in beverage cooler 30, with the exception that some have been eliminated, and others modified. Seal cap 22, threaded fasteners 18, 20 & 50, and seal washers 24 & 52 of beverage cooler 30 have been eliminated in beverage cooler 130 of the alternative embodiment. The following is a description of the modifications for the beverage cooler 130.

In an alternative embodiment, beverage cooler 130 (FIGS. 12 & 13) has a mouthpiece 110, permanently affixed to a cold cell 112. Mouthpiece 110 is bonded to inner container 16 by embodiment of the upper portion of inner container 16, and an inner container flange 126. This eliminates seal cap 22, seal washers 24 and 52, and threaded fastener 18, all of beverage cooler 30 of the preferred embodiment. Mouthpiece 110 also attaches permanently to an outer container 140, by a snap-on bead and groove fastener 150, for completion of cold cell 112 assembly.

Seal gasket 156 prevents bypass of air or fluid into, or out of cold cell 112. It is compressed between the underside of mouthpiece 110, and the top of an outer container lip 154, when mouthpiece 110 and outer container 140 are attached via snap-on bead and groove fastener 150.

Snap-on beam and groove fastener 150 replaces threaded fastener 50, and may be made permanent with a fastener seal 158. Fastener seal 158 prevents reentry into cold cell 112 after attachment of snap-on bead and groove fastener 150.

An exterior tube 114 slips over the bottom of cold cell 112, and engages a positioning groove 120, and portions of an outer shaft 86, both located on mouthpiece 110. At the same time, a bead positioner 84, located around the lower portion of outer container 140, also engages the interior walls of exterior tube 114, for a snug, friction fit. The positioning groove 120 eliminates the need for threaded fastener 20, and allows exterior tube 114 to be made from the more economical plastic extrusion process.

Beverage cooler 130, may also be fitted for outdoor use (FIGS. 14 & 15), in the same manner as beverage cooler 30 of the preferred embodiment described below.

An outdoor beverage cooler 70 (FIGS. 14 & 15) has snap-on cover 64 fitted over mouthpiece 10. This makes outdoor beverage cooler 70 spillproof, and adds impact protection to mouthpiece 10. When attached, snap-on cover 64 also provides extra thermal insulation, by creating a dead air space within the interior of mouthpiece 10.

A tab 72, along rim 78 of snap-on cover 64, facilitates fitting and removal of snap-on cover 64 from mouthpiece 10. Snap-on cover rim 78 provides mouthpiece 10 with a leakproof seal, and is contoured for quick and easy detachment from mouthpiece 10.

A straw port 74, located on top of snap-on cover 64, is for insertion of a straw 66 into inner container 16, for drinking of the beverage 32.

A straw cap 76 may be fitted over straw 66, to prevent spillage of beverage 32, should outdoor beverage cooler 70 fall over.

An insulative exterior 68 provides outdoor beverage cooler 70 with an extra layer of thermal insulation for protracted operation. It also adds extra impact protection by providing a durable covering over beverage cooler 30. An air vent 82 at the bottom of insulative exterior 68 allows air to escape to prevent compression during insertion of beverage cooler 30.

A wrist strap 80 may be attached to insulative exterior 68 for wearing around the arm, or wrist to free the hands for other uses. It may also be used to attach to a belt or backback.

Accordingly, the reader will see that the beverage cooler of the present invention provides an extremely versatile, and utilitarian device, that is powerful, convenient to use, economical, durable, sanitary, has a positive impact upon the environment, is easy to manufacture, and is useful to persons of all ages. With by beverage cooler, the complete range of cold foods and beverages can be produced at home within minutes, and sustained for hours, without the use of prepared ice or prerefrigeration of the ingredients. Slushes, milk shakes, chilled drinks, and even ice cream and frozen yogurt of the highest quality can now be produced easily at home, and at lower cost for enjoyment at home, at work, at sporting events, picnics, indoors, and outdoors.

While the above description contains many specifications, these should not be construed as limitations on the scope of the invention, but rather an exemplification of one preferred embodiment. Many variations are possible. The principals set forth in the above specification would have excellent results embodied in a can and bottle cooler, mugs, steins, pitchers, carafes, thermal bottles, lunch boxes, beer kegs, ice cream bowls, or any container that holds a thermally treated substance of any kind, such as those used in the medical and scientific fields.

It is also worth noting, that the principals set forth in the above specification have excellent application for containers designed to heat their contents, rather than cool them, wherein heat absorbing materials other than refrigerants would be used. Accordingly, the scope of the invention should be determined, not by the particular embodiments described, but by the appended claims, and their legal equivalents.

I claim:

1. A container for thermal treatment of contents placed therein comprised of:

(a) an inner container open on one end and closed on the other equipped with a flange on said open end, for holding the contents, (b) an outer container equipped with a flanged open end, enclosing said inner container, (c) a thermally treated material which undergoes a substantial change of volume during the usual operation of the container contained within a compartment between the outside of said inner container, and the inside of said outer container, (d) a seal gasket constructed of a compressible material attached between said inner container flange, and said outer container flange, (d) means for attaching said inner container to said outer container for compression of said seal gasket, whereby said inner container, and said outer container may be joined together with a connection that is flexible, of high structural integrity, and that insures the said compartment is leak proof regardless of changes of pressure, or volume that may result from temperature variations of said thermally treated material, said inner container, or said outer container or, misalignment of said inner container, and said outer container.

2. A container for rapid thermal treatment, and holding of contents placed therein that the contents may be maintained in a desired temperature during their consumption comprised of:

(a) a generally cylindrical shaped, *closed end* inner container constructed of a material having good thermal conductivity, [open on one end and closed on the other] for holding the contents, (b) an outer container, enclosing said inner container, (c) a heat absorbing material which undergoes a change of material phase during operation of the container contained within a compartment between [the outside of] said inner container, and [the inside of] said outer container, (d) means for attaching said inner container to said outer container[wherein], (e) *means to prevent* leakage of said heat absorbing material out of [said compartment is prevented] *the container*, (*f.*) said inner container having an elongated interior equal in measurement to at least two [of its] *cylindrical* wall diameters[measured at the widest point horizontally adjacent to], (*g.*) said heat absorbing material [when the container is in the normal upright] position, and having substantial [physical] *thermal* contact [with said heat absorbing material at all times during the usual operation of the container] along [its] *the* elongated exterior sides *of said inner container* with a level equal in measurement to a minimum of said two wall diameters, whereby the contents may be thermally treated more thoroughly, and in less time.

3. A container for rapid thermal treatment, and holding of contents placed therein that the contents may be maintained at a desired temperature during their consumption comprised of:

(a) a *closed end* inner container constructed of a material having good thermal conductivity, [open on one end and closed on the opposite end] for holding the contents, (b) an outer container, enclosing said inner container, (c) a heat absorbing material which undergoes a change of material phase during operation of the container contained within a compartment between [the outside of] said inner container, and [the inside of] said outer container, (d) means for attaching said inner container to said outer container [wherein], (e) *means to prevent* said leakage of said heat absorbing material out of [said compartment is prevented] *the container*, (*f*) said inner container having an interior with a generally rectangular shaped cross section equal in length to at least two times its width, [and having substantial physical contact with]

(*g*.) said heat absorbing material [at all times during the usual operation of the container] *having substantial thermal contact* along [its] *the* larger elongated exterior sides *of said inner container* to a level equal in measurement to a minimum of said two cross sections widths, whereby the contents may be thermally treated more thoroughly, and in less time.

4. A container for rapid cooling of contents placed therein that the contents may be placed below, at, or very near their freezing temperature in a liquid, congealed, or semicongealed condition comprised of:

(a) an inner container constructed of a material having good thermal conductivity for holding the contents, (b) an outer container enclosing said inner container, (c) a water based refrigerant material that may be frozen into a solid within the range of conventional household refrigerator freezers, (d) a fabric constructed of a polymeric material permeated in said refrigerant for altering the rate at which thermal energy flows into, and out of said refrigerant, whereby the degree of congealment of the contents, or said refrigerant may be altered.

5. The container of claim 4 wherein said polymeric fabric is made of plastic.

6. The container of claim 4, wherein said polymeric fabric is made of an elastomer.

7. The container of claim 4, wherein said polymeric fabric is made of glass.

8. A container for rapid cooling of contents placed therein that the contents may be placed below, at, or very near their freezing temperature in a liquid, congealed, or semicongealed condition comprised of:

(a) an inner container constructed of a material having good thermal conductivity for holding the contents, (b) an outer container enclosing said inner container, (c) a water based refrigerant material that may be frozen into a solid within the range of conventional household refrigerator freezes, (d) a fabric constructed of a mineral permeated in said refrigerant for altering the rate at which thermal energy flows into, and out of said refrigerant, whereby the degree of congealment of the contents, or said refrigerant may be altered.

9. The container of claim 8, wherein said mineral fabric is made of metal.

10. The container of claim 8, wherein said metal fabric is among those having high thermal conductivity.

11. The container of claim 10, wherein said metal fabric having high thermal conductivity is aluminum.

12. A container for rapid cooling of contents placed therein comprised of:

(a) an inner container for holding the contents, (b) an outer container enclosing said inner container, (c) a water based refrigerant which during the normal operation of the container undergoes a change of volume in its material phase transformation having direct physical contact with, and filling a compartment substantially devoid of free air between the outside of said inner container, and the inside of said outer container, (d) means for attaching said inner container to said outer container, (e) said inner container constructed of a material that produces a greater flow of thermal energy into, and out of said refrigerant than said outer container, when exposed to the same environment, (f) said outer container having a wall constructed of a dense material which allows a lower amount of thermal energy to flow into, and out of said refrigerant than said inner container, and of sufficient thickness to resist substantial deformation, and maintain the general dimensional integrity of said wall, in spite of increased transformation, (g) a compressible material, affixed to the bottom of said compartment, for absorbing the changes of volume of said refrigerant in its material phase transformation, whereby the expansion volume of said refrigerant may be directed away from said inner container walls, and said outer container walls, and into said compressible material.

13. The container of claim 12, wherein said compressible material is made of plastic.

14. The container of claim 12, wherein said compressible material is made of an elastomer.

15. The container of claim 14, wherein said elastomer is rubber.

16. A container according to claims 1, 2, 3, 4, 8 or 12, further comprising an inner container constructed of a polymeric material.

17. The container of claim 16, wherein said polymeric material inner container is plastic.

18. A container according to claim 1, 2, 3, 4, 8 or 12, further comprising an inner container constructed of a metal.

19. The container of claim 18, wherein said inner container metal is aluminum.

20. A container according to claims 1, 2, 3, 4, 8 or 12, further comprising an outer container constructed of a polymeric material.

21. The container of claim 20, wherein said polymeric material outer container is plastic.

22. The container of claim 20, wherein said polymeric material outer container is an elastomer.

23. A container according to claims 1, 2 or 3, further comprising heat absorbing material that is a refrigerant.

24. A container according to claims 1, 2 or 3, further comprising a gelatinous heat absorbing material.

25. A container according to claims 4, 8 or 12, wherein said water contains about 5 and one half percent salt.

26. The container of claim 2, wherein said inner container interior is equal in measurement to at least two and half of said inner container diameters.

27. The container of claim 2, wherein said level of heat absorbing material is equal in measurement to at least two and a half of said inner container diameters.

28. The container of claim 3, wherein said inner container cross section length is equal in measurement to at least two and a half of said widths.

29. The container of claim 28, wherein said level of heat absorbing material is equal in measurement to at least two and a half of said inner container widths.

30. A container according to claims 1, 2 or 3, further comprising a heat absorbing material that is mostly water.

31. A container according to claim 30, wherein said water contains about 5 and one half percent salt.

*32. A container as in any one of claims 2, or 3, wherein the contents are heated.*

*33. A container as in any one of claims 2, or 3, wherein said inner container has a wall thickness of about 0.80 mm (0.032″) or less.*

*34. A container as in any one of claims 2, or 3, wherein said inner container has a wall thickness of about 0.64 mm (0.025″) or less.*

*35. A container as in any one of claims 2, or 3, wherein said inner container has a wall thickness of about 0.10 mm. (0.004″) or more.*

*36. A container as in any one of claims 2, or 3, wherein the desired condition is congealed.*

*37. A wine freezing container comprised of:*

*(a) a container for holding the wine,*

*(b) a refrigeration means sufficient to freeze a substantial portion of the wine into a congealed condition,*

*(c) a means for preventing substantially complete congealment of the wine,*

*(d) a separation means for maintaining a primarily liquid remaining portion of the wine apart from said congealed portion for consumption in a desired condition.*

*38. A beer freezing container comprised of:*

*(a) a container for holding the beer,*

*(b) a refrigeration means sufficient to freeze a substantial portion of the beer into a congealed condition,*

*(c) a means for preventing substantially complete congealment of the beer,*

*(d) a separation means for maintaining a primarily liquid remaining portion of the beer apart from said congealed portion for consumption in a desired condition.*

*39. A container as in any one of claims 37, or 38, wherein said separation means is a surface sufficiently cooled to cause adherence of said congealment.*

*40. A container for rapid freezing of contents placed therein comprised of:*

*(a) a container for holding the contents,*

*(b) a compartment constructed of a polymeric material having a wall about 0.80 mm (0.032″) or less in thickness for holding a material phase-change refrigerant in thermal contact with the contents,*

*(c) said refrigerant sufficient to freeze a substantial portion of the contents into a congealed, or semi-congealed condition through said wall.*

*41. A container for freezing of contents placed therein comprised of:*

*(a) a container for holding the contents,*

*(b) a walled compartment for holding a material phase-change refrigerant in a volume equal to about half or less the volume of said container in thermal contact with the contents,*

*(c) said refrigerant sufficient to freeze a substantial portion of the contents from a liquid into a congealed, or semi-congealed condition.*

*42. A container as in any one of claims 2, 3, 40, or 41, wherein the contents is water.*

*43. A container as in any one of claims 2, 3, 40, or 41, wherein the contents is a milkshake-like food, or beverage.*

*44. A container as in any one of claims 2, 3, 40, or 41, wherein the contents is a soft drink, or a fruit juice.*

*45. A container as in any one of claims 2, 3, 40, or 41, wherein the contents is ice cream-like food.*

*46. A container for cooling cocktails of high alcohol content such as martinis and the like comprised of:*

*(a) a container for holding the cocktail,*

*(b) a refrigeration means sufficient to maintain the cocktail at a consistent temperature of about −1° C. (30° F.) or below for serving in a desired condition.*

*47. The container of claim 46, wherein said refrigeration is contained with a walled compartment made from a polymeric material.*

*48. A container for freezing alcoholic beverage contents comprised of:*

*(a) a container for holding the contents,*

*(b) a walled compartment for holding a material phase-change refrigerant in thermal contact with the contents,*

*(c) said refrigerant sufficient to freeze a substantial portion of the contents into a congealed, or semi-congealed condition through a wall of said compartment for serving as desired.*

*49. A container as in any one of claims 2, 3, 40, or 48, wherein the contents is a daiquiri-like cocktail.*

*50. A container as in any one of claims 2, 3, 40, or 48, wherein the contents is beer.*

*51. A container as in any one of claims 2, 3, 40, or 48, wherein the contents is wine.*

*52. A container as in any one of claims 41, 47, or 48, wherein said compartment wall is about 0.80 mm (0.032″) or less in thickness.*

*53. A container as in any one of claims 40, 47, or 48, wherein said compartment wall is about 0.64 mm (0.025″) or less in thickness.*

*54. A container as in any one of claims 40, 47, or 48, wherein said compartment wall is about 0.1 mm. (0.004″) or more in thickness.*

*55. A container as in any one of claims 41, or 48, wherein said compartment wall is made from a polymeric material.*

*56. A container as in any one of claims 2, 3, 37, 38, 40, 41, 46, or 48, wherein the container is hand held.*

*57. A container as in any one of claims 37, 38, 46, 41, or 48, wherein said refrigeration, or said refrigerant is a liquid frozen solid.*

*58. A container as in any one of claims 37, 38, 40, 41, 46, or 48, wherein said refrigeration, or said refrigerant is mostly water.*

*59. A container as in any one of claims 37, 38, 40, 41, 46, or 48, wherein said refrigeration, or said refrigerant contains about 5 and one half percent salt.*

*60. A container as in any one of claims 37, 38, 40, 41, 46, or 48, wherein said refrigeration, or said refrigerant is gelatinous.*

*61. A container of as in any of claims 2, 3, 37, 38 or 41, wherein said desired condition is about −1° C. (30° F.) or less.*

*62. A container as in any of claims 2, 3, 37, or 38 wherein said desired condition is about −2° C. (28° F.) or less.*

*63. A container as in any of claims 2, or 3, wherein said desired condition is the freezing temperature of the contents.*

*64. The container of claim 55, wherein said polymeric material is plastic.*

*65. The container of claim 47, wherein said polymeric material is plastic.*

* * * * *